United States Patent
Baker et al.

[11] Patent Number: 5,772,734
[45] Date of Patent: Jun. 30, 1998

[54] MEMBRANE HYBRID PROCESS FOR TREATING LOW-ORGANIC-CONCENTRATION GAS STREAMS

[75] Inventors: Richard W. Baker, Palo Alto; Ramin Daniels, San Jose, both of Calif.

[73] Assignee: Membrane Technology and Research, Inc., Menlo Park, Calif.

[21] Appl. No.: 788,765

[22] Filed: Jan. 24, 1997

[51] Int. Cl.$^6$ .......................... B01D 53/22; B01D 19/00; B01D 53/14

[52] U.S. Cl. ........................ 95/42; 95/45; 95/50; 95/159; 95/169; 95/170; 95/171; 95/237; 96/4; 96/202; 96/355

[58] Field of Search ........................... 55/222, 228, 257.1, 55/267; 95/29, 42, 43, 45, 50, 149, 159, 163, 164, 169, 171, 186, 187, 191, 204, 207, 214, 223, 237; 96/4, 202

[56] References Cited

U.S. PATENT DOCUMENTS

| | | | |
|---|---|---|---|
| 3,837,143 | 9/1974 | Sutherland et al. | 55/32 |
| 4,353,715 | 10/1982 | Mir et al. | 55/22 |
| 4,378,235 | 3/1983 | Cosper et al. | 55/85 |
| 4,421,535 | 12/1983 | Mehra | 62/17 |
| 4,444,571 | 4/1984 | Matson | 55/16 |
| 4,574,005 | 3/1986 | Cobbs, Jr. et al. | 55/48 |
| 4,589,896 | 5/1986 | Chen et al. | 62/28 |
| 4,623,371 | 11/1986 | Mehra | 62/17 |
| 4,772,295 | 9/1988 | Kato et al. | 55/16 |
| 4,793,841 | 12/1988 | Burr | 62/27 |
| 4,906,256 | 3/1990 | Baker et al. | 55/16 |
| 5,051,114 | 9/1991 | Nemser et al. | 55/16 |
| 5,089,033 | 2/1992 | Wijmans | 55/16 |
| 5,102,432 | 4/1992 | Prasad | 55/16 |
| 5,122,165 | 6/1992 | Wang et al. | 95/214 X |
| 5,198,000 | 3/1993 | Grasso et al. | 55/20 |
| 5,199,962 | 4/1993 | Wijmans | 55/16 |
| 5,205,843 | 4/1993 | Kaschemekat et al. | 55/16 |
| 5,273,572 | 12/1993 | Baker et al. | 95/48 |
| 5,306,331 | 4/1994 | Auvil et al. | 95/42 |
| 5,326,385 | 7/1994 | Rajani et al. | 95/46 |
| 5,368,754 | 11/1994 | Von Klock et al. | 95/204 X |
| 5,374,300 | 12/1994 | Kaschemekat | 95/39 |
| 5,389,126 | 2/1995 | Baker et al. | 95/45 |
| 5,399,188 | 3/1995 | Roberts | 95/52 |
| 5,415,684 | 5/1995 | Baker | 95/45 |
| 5,529,612 | 6/1996 | Troost | 95/184 |

FOREIGN PATENT DOCUMENTS

| | | | |
|---|---|---|---|
| 4-180811 | 6/1992 | Japan | 95/39 |

OTHER PUBLICATIONS

K. Geisthardt, J. Holtze, R. Ludwig and T. Pilhofer, "Absorption Process for the Removal of Organic Solutions from Exhaust Air," *Chem. Eng. Technol.* 12, (1989) 63–70.
"From Pollutant to Product," *Hoechst High Chem. Mag.*, 13 (1992).

*Primary Examiner*—Robert Spitzer
*Attorney, Agent, or Firm*—J. Farrant

[57] ABSTRACT

A membrane hybrid process for treating organic-containing gas streams to remove or recover the organic. The process combines absorbent scrubbing, gas stripping, condensation, and membrane separation, and is particularly useful in treating high-volume, low-organic-concentration streams. The process may be operated such that the only products are a clean air stream suitable for venting to the atmosphere, and a small-volume, condensed liquid organic stream suitable to reuse or disposal.

55 Claims, 11 Drawing Sheets

MEMBRANE HYBRID PROCESS FOR TREATING LOW-ORGANIC-CONCENTRATION GAS STREAMS

This invention was made in part with Government support under SBIR Contract Number 68D50097, awarded by the Environmental Protection Agency. The Government has certain rights in this invention.

FIELD OF THE INVENTION

The invention relates to a process for removal of organic compounds from gas streams. More particularly, the invention relates to a combination scrubbing/stripping/membrane separation process.

BACKGROUND OF THE INVENTION

Emissions of organic compounds are a major source of air pollution associated with industrial processes and energy production. Such emissions are a particular problem where low concentrations of the organic are present in high flows of off-gas, particularly if the gas also contains particulate matter. Concentrations of the organic compound are often in the 50–5,000 ppm range, with flow rates in the 1,000–10,000 scfm range. Although these high-volume streams are dilute, in aggregate they represent a significant fraction of the total organic emissions from industrial processes.

A number of treatment techniques are available for handling organic-laden gas streams. Carbon adsorption can be used, provided the gas stream is clean and free of particulates. However, many organic-laden gas streams also contain aerosols and submicron particles, which foul carbon beds. Steam regeneration of carbon adsorption beds also produces hazardous aqueous waste streams contaminated with the dissolved organic. In addition, carbon systems are not suitable for treating gas streams containing halogenated compounds, which can produce corrosive acids during regeneration. Catalytic incineration can be used to treat gas streams containing both organic compounds and particulates, but it is subject to catalyst deactivation, is not suitable for chlorinated compounds, and is difficult to permit. Membrane systems may be used for treating low-flow-rate streams of moderate concentrations, but are generally not cost-effective for treating very low-concentration streams of any size or flow rate.

Scrubbing with an absorbent liquid is a well-known technique for treating low-concentration, high-volume gas streams. However, in most applications, water is used as the scrubbing liquid, limiting the process to streams containing water-soluble organics. Treatment of hydrophobic poorly soluble organics, such as chlorinated solvents, aromatics, and naphthas, would require impossibly large scrubbing units and huge volumes of water. The large-volume aqueous stream produced by such a process would require further costly treatment.

Various hybrid processes have been suggested for treatment of organic-laden gas streams. For example, U.S. Pat. Nos. 5,089,033 and 5,199,962 describe condensation/ membrane separation combinations to remove condensable components from gas streams. Scrubbing to remove the organic, followed by some other process to recover the scrubbing medium, has also been explored. U.S. Pat. No. 4,353,715 discloses scrubbing to remove organic vapor combined with ultrafiltration to regenerate the scrubbing liquid. U.S. Pat. No. 4,574,005 shows scrubbing with oil-based absorbent followed by a stripping step to regenerate the scrubbing oil. U.S. Pat. No. 5,198,000 also describes scrubbing of an organic-contaminated gas stream, and teaches a variety of techniques for recovery of the scrubbing medium—stripping, membrane separation, or distillation, for example. K. Geisthardt et al. describe a combination of scrubbing, stripping and condensation for removal of organics from air, in "Absorption Process for Removal of Organic Solvents for Exhaust Air," *Chemical Engineering Technology,* 12 (1989) p. 63–70. A similar design is described by M. Ulrich in "From Pollutant to Product," *Hoechst High Chem Magazine,* 13 (1992) p. 26–30.

Hybrid processes for the separation of organics from liquid can also be found in the prior art. For example, U.S. Pat. No. 5,273,572 combines gas stripping and membrane separation to remove organics from water.

The aforementioned processes address the problem with a combination of two steps, each of which has constraints due to content, volume, or concentration of the stream to be treated; cost; effectiveness of contaminant removal; and operating parameters, such as pressure, temperature, and stream flow rate. When the steps are combined, the restrictions on one step affect the operation and outcome of the subsequent step, requiring an intricate balance of process conditions to achieve the desired result. Increasing the number of steps in the treatment train increases the complexity of this balancing act. To date, no multistep process has satisfactorily achieved this balance for treatment of low-organic-concentration, high-volume streams.

There remains a need for a technology that removes hydrophobic organics from gas streams in an efficient and economical operation, with no secondary wastes.

SUMMARY OF THE INVENTION

The invention is a process for treating a gas stream to remove or recover an organic compound. In its most basic form, the process is a hybrid scrubbing/stripping/membrane process. More specifically, the process involves a combination of: i) a scrubbing step using a scrubbing liquid to remove the organic compound from the gas stream, ii) a gas stripping step to remove the organic compound from the scrubbing liquid, iii) a condensation step to remove the organic compound from the stripping gas, and iv) a membrane separation step to treat the condenser off-gas. The only products of the process are an air stream which may be clean enough for venting, and a concentrated stream of liquid or gaseous organic. All other intermediate streams are recycled for reuse within the process. The objective is to progressively concentrate the target organic compound in the scrubbing and stripping steps, so that the gas stream to the membrane system is concentrated by a factor of at least 5, more preferably at least 10, yet more preferably at least 20, and most preferably at least 50, compared to the raw gas stream.

Gas streams to be treated by the process of the invention may be effluent streams or internal process streams from such diverse origins as petroleum and petrochemical processes; natural gas processing; manufacture of textiles, plastics, or organic chemicals; surface coating processes; or processes using solvents. The main component of such streams may be air, nitrogen, natural gas or any other gas. Organic compounds that may be removed by the process of the invention include unsaturated and saturated hydrocarbons, such as aliphatic and aromatic hydrocarbons; substituted hydrocarbons, such as halogenated hydrocarbons; and alcohols. The invention is particularly useful for hydrophobic, sparingly-soluble compounds, including chlorinated solvents and aromatic hydrocarbons such as benzene, toluene, xylene, and naphthas, which cannot be scrubbed with water.

The process of the invention is particularly useful for gas streams containing low concentrations of organic compounds, since these streams are not usually suited to other typical treatment methods, such as catalytic incineration or condensation. Carbon adsorption processes are sometimes used for treatment of dilute gas streams, but are not suitable for treating particulate-containing streams or streams laden with halogenated compounds, which react with the carbon and corrode the system. The process of the invention is of particular value when the concentration of the organic compound in the gas stream is as low as 5%, 1%, 5,000 ppm, 1,000 ppm, or less, and when the gas stream is halogenated or contains particulates.

Although the process of the invention is generally most useful in treating low-organic-concentration streams, there are applications in which the process may be used advantageously to treat higher concentration streams of very large volume. As the concentration of the organic compound increases in the scrubbing and stripping steps, the volume of gas going to the membrane separation system is reduced, allowing the use of less membrane area, thus making the membrane system more efficient and cost-effective.

The scrubbing step can be carried out using scrubbers of any configuration, such as packed towers, atomized mist scrubbers, and venturi scrubbers. Suitable scrubbing liquids may be organic or inorganic, must have good solubility for the target organic compound, and must be easily regenerable in the stripping step. They should also have a low vapor pressure to minimize losses with the clean gas, a low water solubility to minimize water sorption from humid gases, and a high ignition and flash point to minimize fire hazards. Suitable scrubbing liquids include low viscosity silicone oils, light mineral oils, and glycol ethers. A preferred scrubbing liquid, especially for air streams, is triethylene glycol dibutyl ether. Light mineral oils are preferred for many natural gas and refinery waste gas streams.

The scrubbing step is normally carried out at close to ambient temperatures and pressures, but scrubbing at low temperatures and elevated pressures may be preferred where the gas is available under these conditions or very high levels of removal are required. In natural gas processing, in particular, the feed gas is often treated at high pressures. In a few cases, aqueous solutions may be used as a scrubbing liquid. These solutions are generally not preferred, because the relatively high volatility of water means a good deal of water is carried over with the organic compound when the organic is removed in the stripping operation, and this water tends to contaminate the recovered organic. Typically, the scrubbing step removes at least about 90%, more preferably at least about 95%, and most preferably at least about 98% of the organic compound from the raw gas stream.

The stripping step removes the organic compound from the scrubbing liquid, thereby regenerating the scrubbing liquid for reuse. This is an important advantage of the invention, since if the scrubbing liquid is any material other than water, there are significant costs associated with replacing or disposing of the used scrubbing liquid. Even if water is used, remediation or disposal costs for an organic-contaminated water stream may be considerable. For the process to be economically useful, the stripping step should remove at least about 80%, more preferably at least about 90%, and most preferably at least about 95% of the organic compound from the scrubbing liquid. These results are best obtained when the organic-enriched scrubbing liquid is heated prior to the stripping step, preferably to about 30° C., more preferably to about 40° C., most preferably to about 50° C. or more above the temperature of the scrubbing step. If, for example, the scrubbing step is performed at ambient temperature, the stripping step should preferably be done at about at least 50° C., more preferably at about at least 60° C., most preferably at about at least 70° C. The organic removal rate is further improved by decreasing the pressure in the stripping column to below the pressure in the scrubbing unit. Generally the scrubber:stripper pressure ratio will be at least about 5, more preferably at least about 7, still more preferably at least about 15, and most preferably at least about 30 or more. For example, when the scrubbing unit is operated at ambient pressure, the stripping column pressure is preferably less than about 3 psia, more preferably less than about 2 psia, still more preferably less than about 1 psia, most preferably less than about 0.5 psia. The stripping gas may be any non-condensable gas, such as air, nitrogen, helium, methane, or some other inert gas, depending on the nature of the gas stream, the nature of the organic compound, and the nature of the scrubbing liquid.

The condensation step removes a significant portion of the organic compound from the stripping gas, leaving a small-volume, highly-concentrated gas or liquid stream, suitable for disposal or reclamation for some other use. The condensation step typically involves compressing the gas stream to about 150 psia using an air-cooled or water-cooled compressor. The condensation step preferably will remove 50% of the organic compound from the stripping gas, more preferably about 70%, most preferably about 90%.

The non-condensed portion of the stripping gas stream is subjected to a membrane separation step to remove any remaining organic compound and to recover clean strip gas for discharge, or more preferably, for recycle to the stripping step. Again, this is an important advantage of the invention, since if the strip gas is any gas other than air, there are significant costs associated with replacing or disposing of the used strip gas. Even if air is used in the stripping step, costs for remediation for an organic-contaminated air stream may be considerable.

The membrane separation process may be configured in many possible ways, and may include a single membrane stage or an array or two or more units that permit multiple treatments of the permeate and/or residue streams from the first unit. The driving force for membrane permeation is the pressure difference between the feed and permeate sides. The feed side pressure is preferably less than about 300 psig, more preferably less than about 150 psig.

The membrane is typically organic-selective, that is, the organic is concentrated in the permeate. In this case the membrane may be a rubbery membrane, such as silicone rubber or a polyamide-polyether block copolymer having the formula:

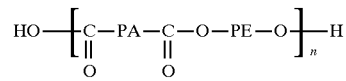

where PA is a polyamide segment, PE is a polyether segment, and n is a positive integer. Other options for organic-selective membranes are the super-glassy membranes, such as those made with poly [trimethylsilylpropyne] (PTMSP). Alternatively, the membrane could be organic-rejecting, in which case the membrane would be a glassy membrane, such as polysulfones, polyimides, polyamides, polyphenylene oxide, polycarbonates, ethylcellulose, or cellulose acetate. The organic-enriched stream may be recycled to the condensation step for further recovery of the organic compound.

DETAILED DESCRIPTION OF THE INVENTION

Figure 1:
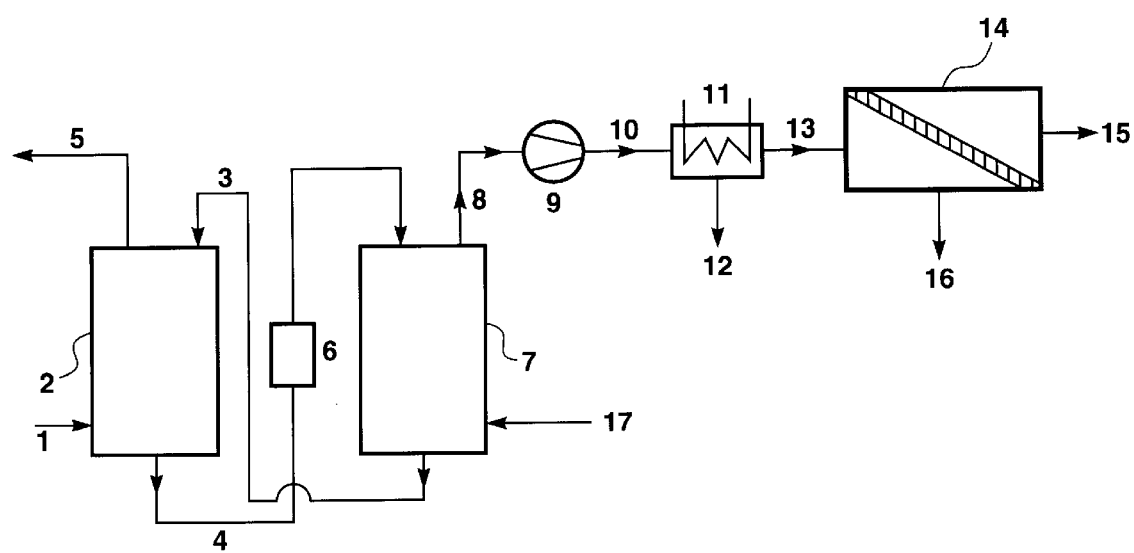
FIG. 1 is a schematic drawing of the most basic embodiment of the process.

As used herein, gas means gas or vapor.

As used herein, all percents refer to volume percents, unless otherwise indicated.

The invention is a process for treating a gas stream to remove or recover an organic compound. In its most basic form, the process is a hybrid scrubbing/stripping/membrane process. More specifically, the process involves a combination of: i) a scrubbing step using a scrubbing liquid to absorb the organic compound from the raw gas stream, ii) a gas stripping step to strip the organic compound from the scrubbing liquid, iii) a condensation step to remove the organic compound from the stripping gas, and iv) a membrane separation step to treat the condenser off-gas. The only products of the process are: a) a gas stream which may be recovered for use or further treatment, or, in the case of air or nitrogen, if clean enough, may be vented to the atmosphere; and b) a concentrated gas or liquid organic stream, which, depending on its nature, likewise may be recovered for use, further treatment, or disposal. All other intermediate streams may optionally be recycled for reuse within the process.

Gas streams to be treated by the process of the invention may be effluent streams or internal process streams from such diverse origins as petroleum and petrochemical processes; natural gas processing; manufacture of textiles, plastics, or organic chemicals; surface coating processes; or processes using solvents. The main component of such streams may be air, nitrogen, natural gas, or any other gas. Organic compounds that may be removed by the process of the invention include unsaturated and saturated hydrocarbons, such as aliphatic and aromatic hydrocarbons; substituted hydrocarbons, such as halogenated hydrocarbons; and alcohols. The invention is particularly useful for hydrophobic, sparingly-soluble compounds, including chlorinated solvents and aromatic hydrocarbons such as benzene, toluene, xylene, and naphthas, which cannot be scrubbed cost-effectively with water.

The process of the invention is most useful for gas streams containing low concentrations of organic compounds, since these streams are not usually suited to other typical treatment methods, such as catalytic incineration or condensation. Carbon adsorption processes are often used for treating low-organic-concentration streams, but are not suitable for treating streams containing particulate matter, which can foul the carbon bed, or streams containing halogenated compounds, which react to liberate corrosive acids during bed regeneration. Our process is applicable to gas streams containing all types of organic compounds. The process is particularly valuable when the concentration of the organic compound in the gas stream is as low as 5%, 1%, 5,000 ppm, 1,000 ppm, or less.

Although the process of the invention is generally most useful in treating low-organic-concentration streams, there are applications in which the process may be used advantageously to treat higher concentration streams, such as those of very large volume. As the concentration of the organic compound increases in the scrubbing and stripping steps, the volume of gas going to the membrane separation system is reduced, allowing the use of less membrane area, thus making the membrane system more efficient and cost-effective. This embodiment of the invention is particularly useful in natural gas processing, for example, where the gas streams are frequently very large, on the order of 20 Mmscfd or more.

The process of the invention uses the scrubber and stripper systems to preconcentrate the gas stream by a factor of at least 5, more preferably at least 10, yet more preferably at least 20, and most preferably at least 50. This reduces the volume of gas to be handled by the membrane system by a corresponding amount. Enrichments of greater than 100-fold require extreme and expensive operating conditions, which are not practical expect in a few specialized circumstances; enrichments below 5-fold are most times insufficient to justify the complexity of the process. Enrichments of 20-fold, 50-fold, or that order will provide sufficient concentration of many commonly encountered streams to enable the membrane unit to operate in the concentration/volume flow range, such as greater than 5%/less than 1,000 scfm, where membranes are typically most competitive against other technologies. The combination of moderate demands on the scrubbing and stripping steps and moderate demands on the membrane step yields an overall efficient and economically attractive process.

The bulk of the enrichment can best be achieved by a difference in pressure between the scrubber and the stripping column. In general, the process requires a scrubber: stripper pressure ratio of the order 10 to 50 to make the process viable. Further enrichment is achieved by the difference in temperature between the scrubber and the stripper. Typical temperature differences will be between 20° and 100° C.

A schematic diagram of the process in its most general form is shown in FIG. 1. In this figure, the raw gas stream is fed via line 1 into a scrubber, 2, where the stream comes into intimate contact with a scrubbing liquid entering through line 3. The scrubbing liquid absorbs the organic compound from the gas stream, leaving an organic-depleted gas stream, exiting through line 5, to be sent for reclamation or further treatment, or, if clean enough, to be discharged to the atmosphere. The organic-laden scrubbing liquid in line 4 is passed through a means for providing a driving force in the liquid-circulating loop, 6, and sent to stripping column, 7, where the liquid comes into intimate contact with stripping gas entering through line 17. The stripping gas removes the organic compound from the scrubbing liquid, which is recycled through line 3 to the scrubber. The organic-laden stripping gas in line 8 is compressed in compressor 9. The compressed gas in line 10 is fed to condenser 11, which condenses the gas to produce a liquid organic stream, recovered via line 12, and a non-condensed gas stream, in line 13. The non-condensed stream is sent to a membrane separation unit, 14, which produces a permeate stream, exiting through line 15, and a residue stream, exiting through line 16.

The apparatus used to carry out the process will, of course, include other components. For example, a pump or blower may be used upstream of the scrubbing unit to circulate the gas stream through the scrubber. In addition, a cooler may be used between the blower and scrubber to cool the incoming gas stream. A heater may be installed upstream of the stripping unit to heat the incoming organic-enriched scrubbing liquid to the stripper. A pump may be positioned in the gas outlet line from the stripping unit to draw gas through the stripper. A condenser may be positioned downstream of the pump to recover scrubbing liquid that is dissolved in the stripping gas. A compressor may be installed upstream of the membrane unit to raise the pressure of the membrane unit feed gas and thereby provide a transmembrane driving force. Alternatively or additionally, a vacuum pump may be connected to the permeate side of the membrane unit to lower the permeate pressure and thereby provide or enhance the transmembrane driving force.

FIG. 1 shows the membrane separation operation as a single-stage operation. However, if the permeate stream is not sufficiently pure for reuse or further treatment, a multistage membrane system, in which the permeate from one stage becomes the feed to the next stage, may be employed. Likewise, if the residue stream is not sufficiently pure, a multistep system, in which the residue from one step becomes the feed to the next step, may be used. Examples of multistage and multistep membrane systems are discussed in detail in co-owned U.S. Pat. No. 5,273,572, which is incorporated herein by reference.

Scrubbing Step

Scrubbing is a well-known, economical, and efficient technique for treating low-concentration, high-volume gas streams containing organic compounds. The objective is to concentrate the target gaseous organic compound in the scrubbing medium, which can then be disposed of or treated further. In wet-scrubbing, the organic-laden gas stream is contacted with a liquid, into which the organic compound dissolves. In most prior art applications, the scrubbing liquid, generally water, is not regenerated and recycled. This limits the scrubbing process to water-soluble organics, such as acetone, ethanol, methanol, or acidic or basic compounds such as acetic acid or amines. Hydrophobic organic compounds would require impossibly large scrubbing units and huge volumes of water to strip them from the gas stream. Treatment or disposal of such organic-contaminated aqueous streams could be costly.

For the process of the invention, on the other hand, the scrubbing liquid can be chosen for its ability to scrub the target organic compound and for its ease of regeneration in the stripping step. Suitable scrubbing liquids may be organic or inorganic. The basic requirement of the scrubbing liquid is that it should freely dissolve the target component. In other words, the equilibrium concentration of the component in the scrubbing liquid should be high compared with the concentration in the gas phase. By high, we mean that the scrubbing liquid should preferably have a Henry's law partition coefficient of no higher than about $1 \times 10^{-3}$ mg/m$^3$ (gas)/mg/m$^3$ (liquid). Other desirable characteristics are:

Easily regenerable by the stripping gas in the stripping step.

Stable at stripping temperature.

Low vapor pressure to minimize losses and eliminate secondary atmospheric emissions.

Low water solubility to minimize water sorption from humid gas streams.

High ignition and flash point to minimize fire and explosion hazards.

Low viscosity. Many organic liquids are too viscous for use in an industrial scrubber.

Nontoxic and noncorrosive.

Although the scrubbing fluid will normally be a one-phase mixture, an emulsion formed by dispersing the scrubbing fluid within a second phase is an alternative that could be used, for example, when the scrubbing fluid has a very high viscosity and cannot be used as a single-phase medium.

Suitable scrubbing liquids include low viscosity silicone oils, light mineral oils, heat transfer fluids, and glycol ethers. Glycols, preferably polyethylene glycol ethers, and light mineral oils, that is, $C_{6+}$ aliphatic hydrocarbons, are preferred scrubbing liquids. A most preferred scrubbing liquid for use with organic/air mixtures is triethylene glycol dibutyl ether, commercially available as Genosorb 1843 (Hoechst-Celanese, Charlotte, N.C.). Light mineral oils are preferred for treating natural gas and refinery gas streams.

The process of the invention may employ any of a number of scrubber configurations, such as packed towers, atomized mist scrubbers, venturi scrubbers, or membrane contactors. We prefer to use a packed tower.

The scrubbing step may be carried out at any temperature and pressure. It will be apparent to those of skill in the art that the choice of temperature and pressure for the scrubbing step will depend on the nature of the raw gas stream and the organic component to be removed. The choice will also be dependent on the temperature and pressure requirements of the subsequent stripping and membrane steps. We prefer to perform the scrubbing step at or near ambient temperature and atmospheric pressure, to avoid the expense of a large, high-pressure vessel. However, if the raw feed gas is at high pressure, such as a natural gas or refinery waste gas stream, it is generally more cost-effective to perform the scrubbing operation at high pressure than to depressurize and repressurize the stream.

An important parameter in the scrubbing step is the gas:liquid ratio in the column. At high gas:liquid ratios, the efficiency of the absorption column deteriorates. As a result, the concentration of the organic compound in the discharged gas stream may be too high for direct exhaust to the atmosphere or for subsequent use without extensive additional treatment. At low gas:liquid ratios, organic removal increases. However, the costs for heating and cooling the scrubbing liquid as it is recirculated rise significantly, and the increase in organic removal is not great enough to offset these additional costs.

The actual gas:liquid volume ratio used in a scrubber will vary over a wide range, and will depend on the composition of the component to be absorbed, the composition of the scrubbing liquid, and the temperature and pressure in the scrubber. For economical operation, the ratio should be as high as possible, that is, as little liquid as possible should be used. With a scrubber operating at ambient conditions, a gas:liquid ratio of >100 will normally be used. In special cases, such as high-pressure natural gas, a ratio of less than 50, even as low as 5 or 10, can be practical.

Depending on the scrubbing liquid used and the component to be scrubbed, the scrubbing step will remove at least about 90%, more preferably at least about 95%, and most preferably at least about 98% of the organic compound from the raw gas stream.

The raw gas stream may contain undesirable components or other contaminants that are sorbed into the scrubbing liquid, but cannot be subsequently removed by the stripping gas. As the scrubbing liquid recirculates, it becomes progressively more polluted with the undesirable components. At some point, the scrubbing liquid may become so contaminated with these components that it can no longer effectively scrub the target organic from the raw gas stream. To control the concentration of the contaminant in the scrubbing liquid, a portion of the liquid may need to be intermittently or continuously bled from the system and replaced with fresh scrubbing liquid.

Stripping Step

The stripping step can use a gas stripper of any type, and of any flow configuration, that enables the organic-laden gas to be confined and passed on to the membrane system. Membrane contactors may be used; however, tower strippers are preferred, including spray towers, trayed towers and packed towers. In a spray tower, the liquid is broken into fine droplets by pumping it through nozzles. The stripping gas is passed up through the tower, normally countercurrent to the descending spray. In a trayed tower, the stripping gas is bubbled through the liquid in a series of aeration trays. In a packed tower, a packing medium is used to maximize the gas/liquid contact surfaces. Packed towers are the most preferred tower type. The most preferred operating configuration is countercurrent, in which the liquid passes from top to bottom of the tower and the gas passes from bottom to top. Other configurations, for example, crossflow, in which the liquid passes from top to bottom and the gas flows in at the sides, to the center and then out the top, may also be used. The stripping gas may be delivered by a forced draft blower or pump on the inlet side or by an induced draft system on the outlet side.

The stripping step increases the concentration of the target organic compound, now in a gaseous state, so that the gas stream leaving the stripper is sufficiently concentrated to make membrane separation efficient and cost-effective. Furthermore, the stripping step removes the organic compound from the scrubbing liquid, thereby regenerating the scrubbing liquid for reuse. This is an important advantage of the invention, since if the scrubbing liquid is any material other than water, there may be significant costs associated with disposal or replacement of the contaminated scrubbing liquid. Even if water is used, remediation or disposal costs for an organic-contaminated water stream may be considerable. For the process to be economically useful, the stripping step should preferably remove at least about 80%, more preferably at least about 90%, and most preferably at least about 95% of the organic compound from the scrubbing liquid. These results are best obtained when several variables are balanced.

(1) Temperature

Organic removal from the scrubbing liquid generally increases with increasing temperature, because the vapor pressure of the dissolved organic increases, providing a greater driving force for the transfer of the organic from the liquid to the gas. Generally the stripper will operate at 20°–100° C. hotter than the scrubber, preferably at about 30° C. hotter, more preferably at about 40° C. hotter, most preferably at about 50° C. or hotter than the temperature of the scrubbing step For instance, if the scrubbing step has been performed at ambient temperature, organic removal from the scrubbing liquid will be improved if the stripping step is done at a higher temperature, preferably at about 30° C., more preferably about 40° C., most preferably about 50° C. or more above the temperature of the scrubbing step.

Direct heating may be used, but it is preferable to take advantage of heat exchange possibilities. For example, the organic-laden scrubbing liquid may be warmed by using it to cool any vacuum pumps or compressors used in the apparatus. If chilling is used in the condensation step, the gas passing through the membrane unit will be cool. This gas also can be used to cool any vacuum pumps or compressors in the apparatus and then returned warm to the gas stripper. Depending on the specific system design and components, many such heat-integration arrangements will be apparent to those of skill in the art.

(2) Pressure

The removal rate of organic from the scrubbing liquid is further improved by operating the stripping column at relatively low pressure compared to the scrubbing unit. Generally the scrubber:stripper pressure ratio will be at least about 5, more preferably at least about 7, still more preferably at least about 15, and most preferably at least about 30 or more. At pressures above atmospheric, organic removal performance generally decreases. At very low pressures, there may be little additional improvement in organic removal. Additionally, at lower operating pressures, the vacuum pump horsepower requirement increases, and foaming of the scrubbing liquid in the stripping column may become a problem.

In operations of the processes with organic/air streams, when the scrubber is at atmospheric pressure, we prefer to maintain a stripping column pressure less than about 3 psia, more preferably less than about 2 psia, still more preferably less than about 1 psia, most preferably less than about 0.5 psia. A vacuum pump or a compressor, or both, may be used to achieve the reduced pressure in the stripper. For efficiency, if the subsequent membrane step is driven by lowering the pressure on the permeate side, the same vacuum pump may conveniently be used both to lower the pressure of the stripping operation and to provide a driving force for membrane permeation.

In processing natural gas and refinery gas streams, where the scrubbing unit is operated at pressures of 10–50 atm, operation of the stripping tower at atmospheric pressure may provide an adequate pressure ratio for effective stripping.

(3) Gas Flow Rate and Gas:Liquid Ratio

The gas flow rate from the membrane unit to the stripping column is an important parameter in regenerating the scrubbing liquid. If the gas flow rate to the stripping column is too small, organic removal from the scrubbing liquid is poor. If the gas flow rate is very large, organic removal from the scrubbing liquid is good, but the subsequent membrane step may be unable to remove sufficient amount of organic from the very large volume of stripping gas, unless a much larger membrane area is used.

Varying the gas:liquid ratio in the stripping step will produce a different concentration in the effluent going to the membrane system. Generally, a high gas:liquid ratio yields a high-volume, low-concentration gas stream to the membrane unit. A low gas:liquid ratio will yield a low-volume, high-concentration gas stream to the membrane unit. The choice of gas:liquid ratio will depend on the nature of the separation being performed, that is, the nature of the organic compound being removed; whether the stripping gas, after treatment in the membrane system, will be vented to the atmosphere or recycled to the process; and whether the liquid recovered from the stripping unit will be disposed of or recycled to the scrubbing step. In general, the gas:liquid volume ratio in the stripper will be about the same or less than the volume ratio used in the scrubber. Of course, since the stripper is usually operated at a much lower pressure than the scrubber, the molar ratio of gas to liquid is much less in the stripper. In the most preferred embodiment of the invention, a balance of parameters should be achieved to produce stripping gas and scrubbing liquid clean enough to be suitable for recycle within the system.

Figure 2:
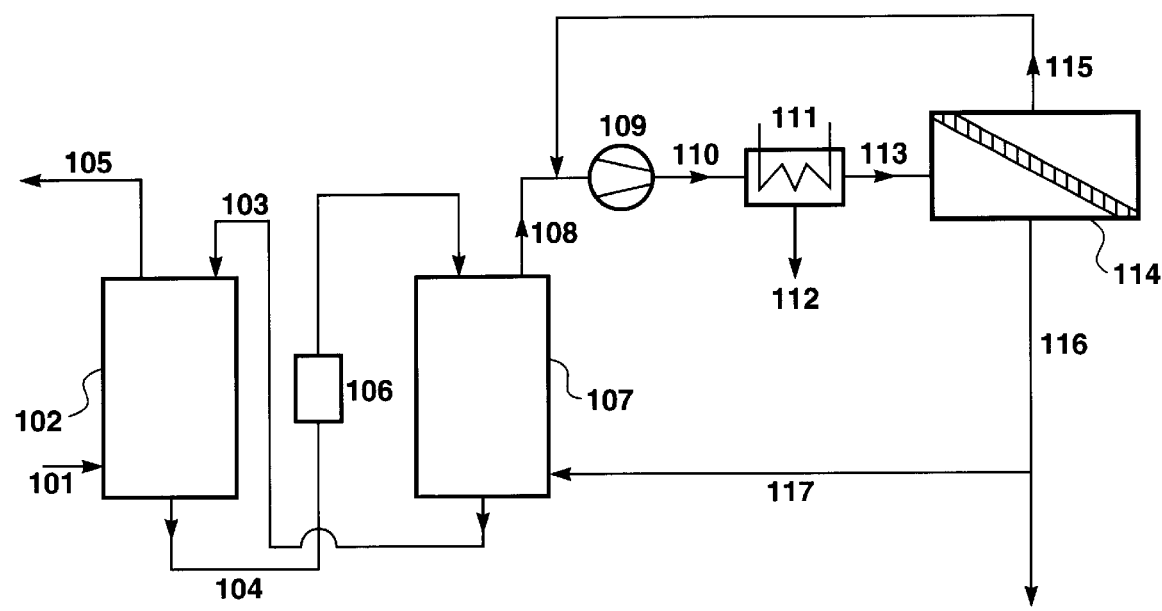
FIG. 2 is a schematic drawing of the process employing recycle of the stripping gas.

A schematic diagram of the process employing partial recycle of the stripping gas is shown in FIG. 2. In this figure, the raw gas stream, entering through line 101, is fed into a scrubber, 102, where the stream comes into intimate contact with scrubbing liquid entering through line 103. The scrubbing liquid absorbs the organic compound from the gas stream, leaving an organic-depleted gas stream exiting through line 105, to be sent for reclamation or further treatment, or, if clean enough, to be discharged to the atmosphere. The organic-laden scrubbing liquid, in line 104, is passed through a means for providing a driving force in the liquid-circulating loop, 106, and sent to stripping column, 107, where the liquid comes into intimate contact with stripping gas, entering through line 117. The stripping gas removes the organic compound from the scrubbing liquid, which is recycled through line 103 to the scrubber. The organic-laden stripping gas in line 108, is compressed in compressor 109. The compressed gas in line 110 is fed to condenser 111, which condenses the gas to produce a liquid organic stream, recovered via line 112, and a non-condensed gas stream in line 113. This stream is sent to a membrane separation unit, 114, which produces an organic-enriched permeate stream, exiting through line 115, which may be recycled to the front of compressor 109 for further compression and condensation. The residue stream, exiting through line 116, is organic-depleted stripping gas, all or a portion of which may be recycled through line 117 to the stripping column.

If only a portion of the regenerated stripping gas is reused, fresh stripping gas must be added at each pass through the stripper. This might be the case, for example, if nitrogen is used to provide an inert stripping atmosphere. If oxygen leaks into the system, partial discharge of the treated stream may be necessary to keep the oxygen content of the stripping gas to a level safely below the lower explosion limit. Then the stripping gas may be topped up with fresh, high-purity nitrogen. Partial discharge, or operation in feed-and-bleed mode, is also appropriate if there are components that are stripped from the scrubbing liquid, but that are not well removed by the membrane system, so that they build up in the stripping loop.

This may be the case, for example, when treating a natural gas stream from which $C_{3+}$ hydrocarbons are to be removed. In this application, a portion of the membrane residue stream is bled off to reduce build-up of $C_2$ and $C_3$ components in the stripper loop. This bleed gas is returned to the front of the process and mixed with the incoming feed for treatment in the scrubber.

The stripping process is usually carried out using a single stripper. Alternative embodiments employ multiple strippers, either of the same or different type (for example, packed or tray strippers), operating in the same or different modes (for example, counter flow or cross flow), or employing similar or different operating conditions (for example, different gas:liquid ratios). The use of multiple strippers provides additional removal of the organic from the scrubbing liquid where necessary, thereby producing a cleaner scrubbing liquid recycle stream and a more-organic-enriched gas stream to be sent to the membrane system.

Alternatively, the stripping step may be a combination of a stripper and another removal process, such as adsorption, absorption, catalytic incineration, chemical destruction, ozonation, or biological treatment, for example. These optional stripping configurations permit the removal of different sorts of compounds from one stream containing multiple organic compounds, such as volatile and non-volatile or halogenated and non-halogenated compounds, without the need for two distinct separation systems.

The stripping gas may be air, nitrogen, methane, hydrogen, helium, or other gas, depending on the nature of the gas stream, the nature of the organic compound, and the nature of the scrubbing liquid. Typically, the stripping gas is a non-condensable gas under normal operating conditions, that is, it has a boiling point below about $-50°$ C. at 1 atm pressure. Air is often a preferred stripping gas because it is cheap and readily available; however, it is not suitable for some separations. For example, nitrogen or carbon dioxide might be a better stripping gas for use with an organic compound that forms a potentially explosive mixture with air. Alternatively, a stripping gas suitable to the ultimate destination of the organic compound may be used. For example, if the organic compound is to be disposed of rather than recovered, methane may be used as the stripping gas. The membrane system is then used to produce a permeate stream enriched in the organic compound and containing just enough methane to make disposal by incineration practical. As an alternative or supplement to a non-condensable stripping gas, steam may also be used as all or part of the stripping gas, in which case the steam provides some or all of the heat which facilitates organic removal from the scrubbing liquid. The stripping gas may also be chosen to provide improved partitioning between the gas and water phases.

Condensation Step

The goal of the condensation step is to bring the gas stream to a pressure/temperature condition beyond the dewpoint of the organic component, so that a portion of that component will condense out of the gas stream in liquid form. The amount of the component that can be removed from the gas stream in this way will depend on the dewpoint of the component, its concentration in the feed, and the operating conditions under which the condensation is performed. The condensation step typically removes a significant portion of the organic compound from the stripping gas, producing a small-volume, highly-concentrated liquid stream, suitable for disposal or reclamation for some other use. The condensation step preferably will remove more than about 50% of the organic compound from the stripping gas, more preferably more than about 70%, most preferably more than about 90%.

The condensation step may involve chilling or compression alone, but will usually involve both. Compressing the gas raises the dewpoint temperature, so a combination of compression and chilling is generally preferred. Sometimes, however, the gas stream may already be at high pressure or at low temperature before entering the process, so that only compression or chilling is needed to take the stream beyond the dew point and produce partial condensation.

It is desirable to avoid very high pressures and very low temperatures, since reaching these conditions adds to the cost and complexity of the processes. By very high pressures, we mean pressures in excess of about 500 psig or 30 atm. The pressure at which the condensation step is operated should preferably be in the range 0–500 psig, more preferably in the range 0–250 psig, and most preferably in the range 100–150 psig.

By very low temperatures, we mean temperatures below −100° C. The temperature at which the condensation step is operated should preferably be in the range 30° C. to −50° C. More preferably, however, the temperature should be above −20° C., and most preferably in the range 20° C. to 0° C. Staying above 0° C. avoids ice formation in the condenser. Temperatures in this range should be possible to reach by single-stage refrigeration, and often can be reached by simple water cooling.

Figure 5:
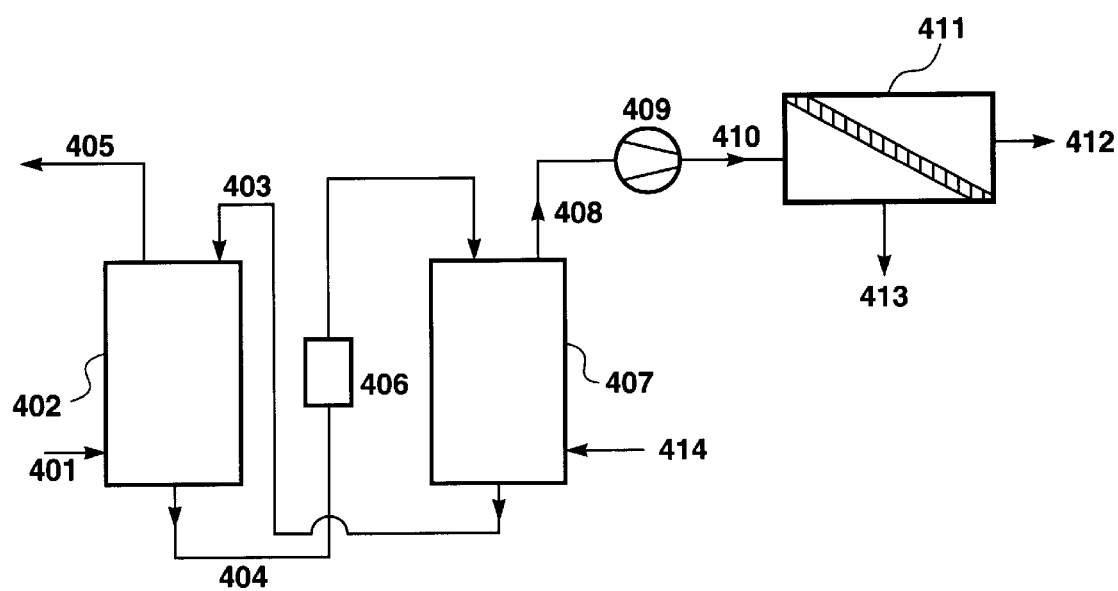
FIG. 5 is a schematic drawing of the process without the condensation step.

There are situations in which the condensation step may be omitted. Such an option is shown schematically in FIG. 5. In this figure, the raw gas stream, entering through line 401, is fed into a scrubber, 402, where the stream comes into intimate contact with scrubbing liquid, entering through line 403. The scrubbing liquid absorbs the organic compound from the gas stream, leaving an organic-depleted gas stream, exiting through line 405, to be sent for reclamation or further treatment, or, if clean enough, to be discharged to the atmosphere. The organic-laden scrubbing liquid in line 404, is passed through a means for providing a driving force in the liquid-circulating loop, 406, and sent to stripping column, 407, where the liquid comes into intimate contact with stripping gas, entering through line 414. The stripping gas removes the organic compound from the scrubbing liquid, which is recycled through line 403 to the scrubber. The organic-laden stripping gas, in line 408, may be compressed in optional compressor, 409. The compressed stream, in line 410, is fed to a membrane separation unit, 411, which produces a permeate stream, exiting through line 412, and a residue stream, exiting through line 413.

Such a process design might be desirable when $C_{3+}$ hydrocarbons are to be separated from methane in a natural gas stream, for example. In this case, the gaseous $C_{3+}$ fraction may be more useful as a gas feedstock. Alternatively, the $C_{3+}$ fraction may be destined for further gas-phase separation or other treatment downstream.

Membrane Separation Step

The non-condensed portion of the stripping gas stream is subjected to a membrane separation step to remove almost all the remaining organic compound from the gas and to recover clean strip gas for discharge to the atmosphere, reclamation, or more preferably, for reuse in the stripping step. This is an important advantage of the invention, since if the strip gas is any gas other than air, there may be significant costs associated with disposing of the used strip gas and replacing it with fresh strip gas. Even if air is used in the stripping step, costs for remediation for an organic-contaminated air stream may be considerable.

The membrane separation process may be configured in many possible ways, and may include a single membrane stage or an array of two or more units that permit multiple treatments of the permeate and/or residue streams from the first unit. The driving force for membrane permeation is the pressure difference between the feed and permeate sides. This pressure difference can be achieved by compressing the feed stream, drawing a vacuum on the permeate side of the membrane, or both. The feed side pressure is preferably less than about 300 psig. In the preferred embodiment, the gas stream entering the membrane unit from the condensation step will already be at high pressure.

The choice of membrane to be used in the membrane separation step depends on the separation to be performed. We prefer to use an organic-selective membrane, since the organic is usually the minor component of the stream to be separated. In this case, the membrane may be a rubbery membrane. Examples of polymers that can be used to make rubbery membranes include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides, and polyesters. Other options for organic-selective membranes are the super-glassy polymers, the best known of which is poly(trimethylsilylpropyne) [PTMSP].

Alternatively, the membrane can be organic-rejecting, in which case the membrane will be glassy, such as polysulfones, polyimides, polyamides, polyphenylene oxide, polycarbonates, ethylcellulose, or cellulose acetate.

Figure 3:
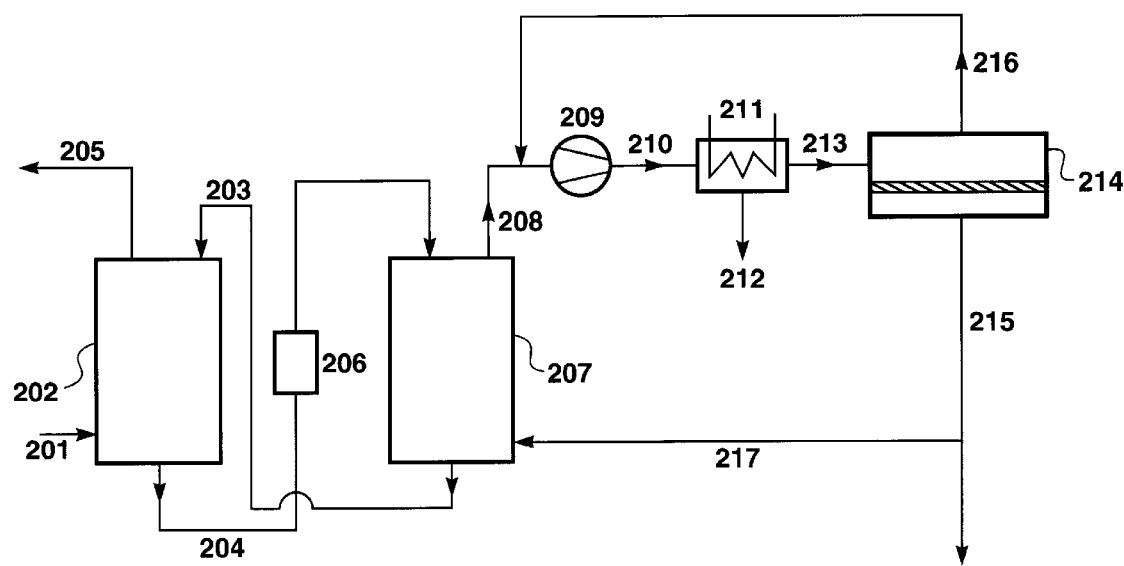
FIG. 3 is a schematic drawing of the process using an organic-rejecting membrane.

A schematic diagram of the process employing an organic-rejecting membrane is shown in FIG. 3. In this figure, the raw gas stream, entering through line 201, is fed into a scrubber, 202, where the stream comes into intimate contact with scrubbing liquid entering through line 203. The scrubbing liquid absorbs the organic compound from the gas stream, leaving an organic-depleted gas stream, exiting through line 205, to be sent for reclamation or further treatment, or, if clean enough, to be discharged to the atmosphere. The organic-laden scrubbing liquid in line 204 is passed through a means for providing a driving force in the liquid-circulating loop, 206, and sent to stripping column 207, where the liquid comes into intimate contact with stripping gas entering through line 217. The stripping gas removes the organic compound from the scrubbing liquid, which is recycled through line 203 to the scrubber. The organic-laden stripping gas in line 208, is compressed in compressor 209. The compressed gas in line 210 is fed to condenser 211, which condenses the gas to produce a liquid organic stream, recoved via line 212, and a non-condensed gas stream, in line 213. This non-condensed stream is sent to a membrane separation unit, 214, which produces an organic-depleted permeate stream, exiting through line 215, a portion of which may be recycled through line 217 to the stripping column. The residue stream, exiting through line 216, is organic-enriched, and may be recycled to the front of condenser 211 for further condensation and membrane separation.

Figure 4:
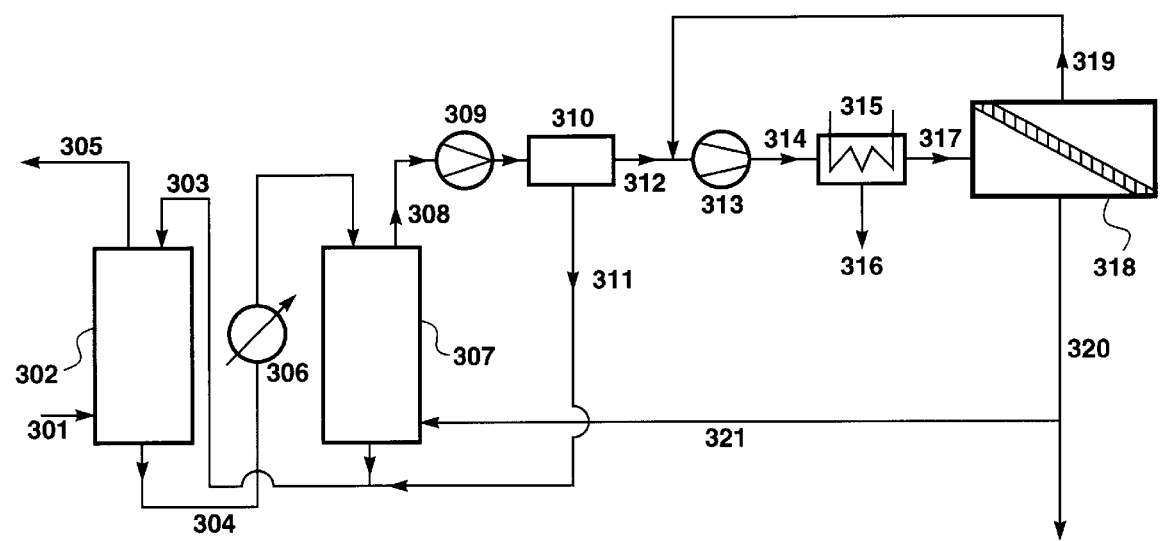
FIG. 4 is a schematic drawing of the most preferred embodiment of the process.

The most preferred embodiment of the invention is shown in FIG. 4. In this figure, the raw gas stream, entering through line 301, is fed to a scrubber, 302, where the stream comes into intimate contact with scrubbing liquid entering through line 303. The scrubbing liquid absorbs the organic compound from the gas stream, leaving an organic-depleted gas stream, exiting through line 305, to be sent for reclamation or further treatment, or, if clean enough, to be discharged to the atmosphere. The organic-laden scrubbing liquid in line 304 is passed through a heater, 306, and sent to stripping column, 307, where the liquid comes into intimate contact with stripping gas, entering through line 321. The stripping gas removes the organic compound from the scrubbing liquid, which is recycled through line 303 to the scrubber. The stripping column is kept under subatmospheric pressure by vacuum pump 309. The organic-laden stripping gas in line 308, is withdrawn through the vacuum line. A gas/liquid separator, 310, removes any entrained scrubbing liquid, which is recovered in line 311, and is joined with line 303 to be recycled to the scrubbing step. The remaining organic-laden gas stream, in line 312, is compressed in compressor 313. The compressed gas, in line 314, is fed to condenser 315, which condenses the gas to produce a liquid organic stream, recovered in line 316, and a non-condensed gas stream, in line 317. The non-condensed stream is sent to a membrane separation unit, 318, which produces an organic-enriched permeate stream, exiting through line 319, to be recycled to the front of compressor 313 for further compression and condensation. The residue stream, exiting through line 320, is organic-depleted stripping gas, a portion of which may be recycled through line 321 to the stripping column.

As with FIG. 1, FIGS. 2, 3, 4, and 5 are schematics showing process concepts and major apparatus elements. The apparatus used to carry out the processes will include other components, such as pumps, blowers, etc., and the membrane unit may contain one membrane stage or an array of multiple stages and/or steps.

The invention is now further illustrated by the following examples, which are intended to be illustrative of the invention, but are not intended to limit the scope or underlying principles of the invention in any way.

EXAMPLES

The examples are in three sets. The first set shows a series of computer calculations performed with a modelling program, ChemCad III (ChemStations, Inc., Houston, Tex.), to illustrate the effect of various operating parameters on the process. The second set of examples gives experimental results obtained on a pilot-scale system. The third set, also computer modelling calculations, demonstrates the utility of the invention in recovering diverse components from specific gas streams.

SET I (Examples 1–3) Computer Modelling Calculations

Example 1

The process design shown in FIG. 4 was used to model the removal of methylene chloride from an air stream. The feed gas, entering through line 301, to the scrubber, 302, was assumed to be a 10,000-scfm (283,000 l/min) air stream containing 1,000 ppm methylene chloride. The scrubbing liquid was assumed to be 77,810 lb/h (588 l/min) of tetra-ethylene-glycol diethyl ether (Tetraglyme). Thus, the gas:liquid volume ratio in the scrubbing unit was about 480. It was assumed that the organic-laden scrubbing liquid was then heated to 70° C., and circulated at 77,810 lb/h (588 l/min) to the stripping column, 307, operating with a 4,480-scfm (127,000 l/min) nitrogen stream at a pressure of 0.5 psia. Thus, the gas:liquid ratio in the stripper was 216.

The combined performance of the scrubber and stripper reduces the volume of gas by a factor of 60, from 10,000 scfm in the original feed stream to 160 scfm in the gas stream leaving the stripper. The organic concentration increases 60-fold, from 1,000 ppm in the raw gas stream to 6 mol % in the gas leaving the stripper, thus bringing the gas into the optimum range for membrane treatment.

The off-gas from the stripper was assumed to be passed through compressor 309, separator 310, compressor 313, and condenser 315, and to a membrane recovery unit, 318. The membrane was assumed to be a silicone rubber membrane having a nitrogen pressure-normalized flux of $80 \times 10^{-6}$ cm$^3$(STP)/cm$^2 \cdot$sec$\cdot$cmHg, and a methylene chloride pressure-normalized flux of $1,600 \times 10^{-6}$ cm$^3$(STP)/cm$^2 \cdot$sec$\cdot$cmHg. The membrane unit produced a methylene chloride-enriched gas stream, recovered from line 319, and a methylene chloride-depleted nitrogen stream, exiting through line 320, a portion of which may be recycled through line 321 to the stripper. Stream 321 contained only 0.16 mol % methylene chloride, indicating that the membrane removed 97 mol % of the organic from the membrane feed stream, 317.

Table 1 shows the results of all the calculations.

TABLE 1

| Component/Parameter | Stream 301 | Stream 303 | Stream 304 | Stream 305 | Stream 308 | Stream 311 | Stream 314 | Stream 316 | Stream 317 | Stream 319 | Stream 321 |
|---|---|---|---|---|---|---|---|---|---|---|---|
| Flow Rate (lbmol/h) | 1,671 | 350 | 353 | 1,668 | 27 | 0.04 | 49 | 2 | 47 | 22 | 25 |
| Temperature (°C.) | 25 | 25 | 25 | 25 | 69 | 25 | 20 | 20 | 20 | 18 | 69 |
| Pressure (psia) | 15 | 15 | 15 | 15 | 0.5 | 0.5 | 150 | 150 | 150 | 15 | 0.5 |
| Component (mol %) | | | | | | | | | | | |
| Tetraglyme | 0 | 99.98 | 99.26 | 0 | 0.14 | 98.62 | 0 | 0 | 0 | 0 | 0 |
| Nitrogen | 97.90 | 0 | 0.13 | 98.02 | 92.10 | 0 | 90.50 | 1.03 | 94.51 | 88.30 | 99.83 |
| Water | 2.00 | 0 | 0.13 | 1.98 | 1.65 | 0 | 1.15 | 21.45 | 0.24 | 0.52 | 0 |
| Methylene Chloride | 0.10 | 115 ppm | 0.48 | 17 ppm | 6.10 | 1.37 | 8.35 | 77.50 | 5.25 | 11.18 | 0.16 |

Example 2

Figure 6:
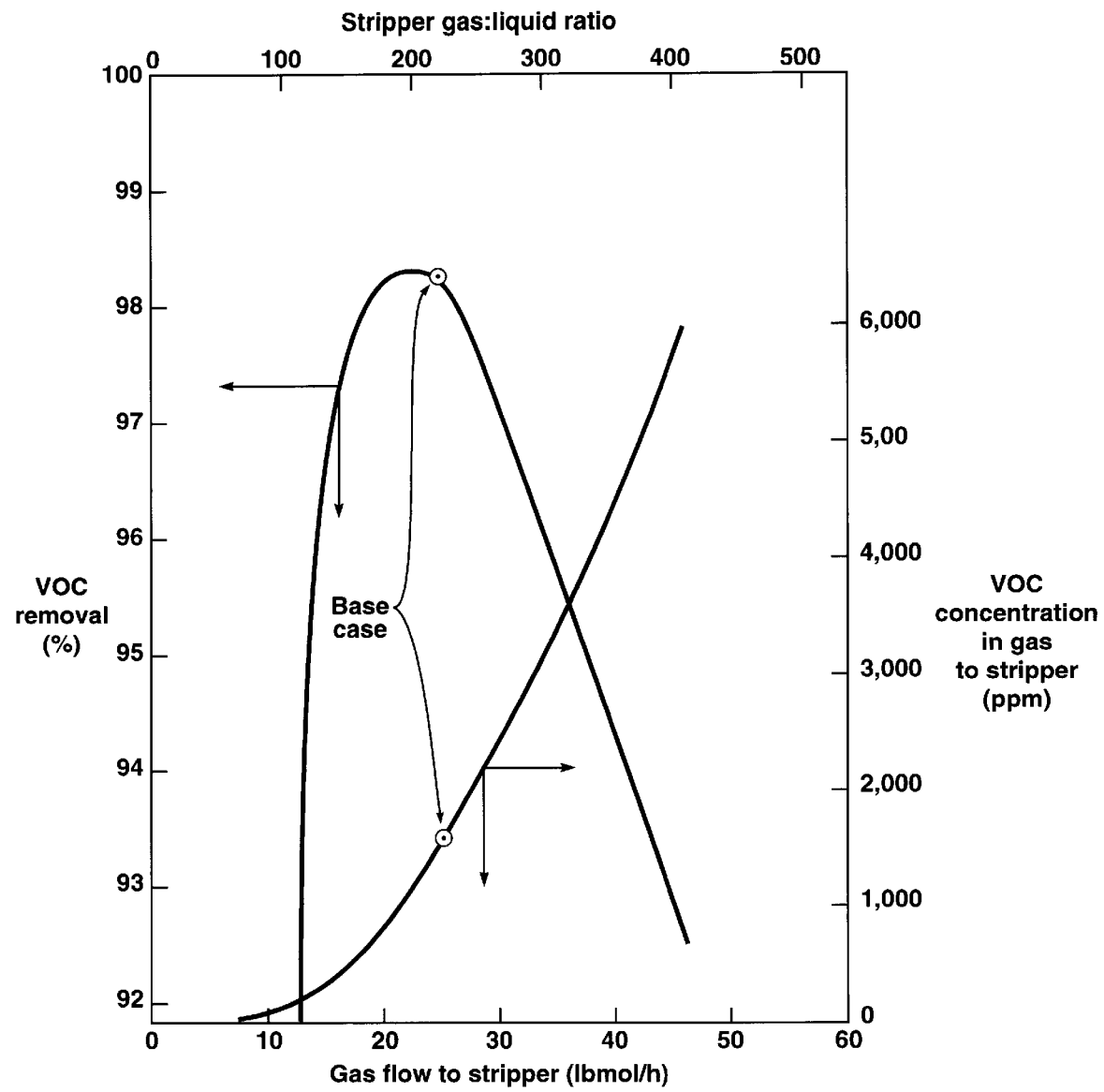
FIG. 6 is a graph showing organic removal rate as a function of gas:liquid ratio in the stripper.

This example shows how the performance of the system can be controlled and optimized by varying the gas flow rate to the stripper. In this calculation, all operating conditions were as in Example 1, except that the gas flow rate to the stripper was varied. FIG. 6 shows the effect of gas flow rate to the stripping column on the organic removal by the system. The Example 1 calculation is represented as the data point labelled "base case."

If the gas flow to the stripping column is small, such as only 10–15 lbmol/h, the methylene chloride is not well-removed from the glycol ether. As a result, the glycol ether, when recycled to the scrubber, is still partially loaded and the methylene chloride removal from the feed air stream is relatively poor, such as only about 90%.

If the gas flow to the stripping column is large, however, the membrane unit, assuming a fixed membrane area of 100 m$^2$, cannot handle the large gas flow. Thus, the recycled gas stream to the stripper remains partially loaded with methylene chloride, reducing the ability of the stripper to regenerate the scrubbing liquid.

Under the assumptions of the example, a gas flow rate of about 18–30 lbmol/h would achieve the optimum removal of 98% of the organic from the feed. In terms of a gas:liquid ratio, this means an optimum ratio in the stripper of about 150–200.

Example 3

Figure 7:
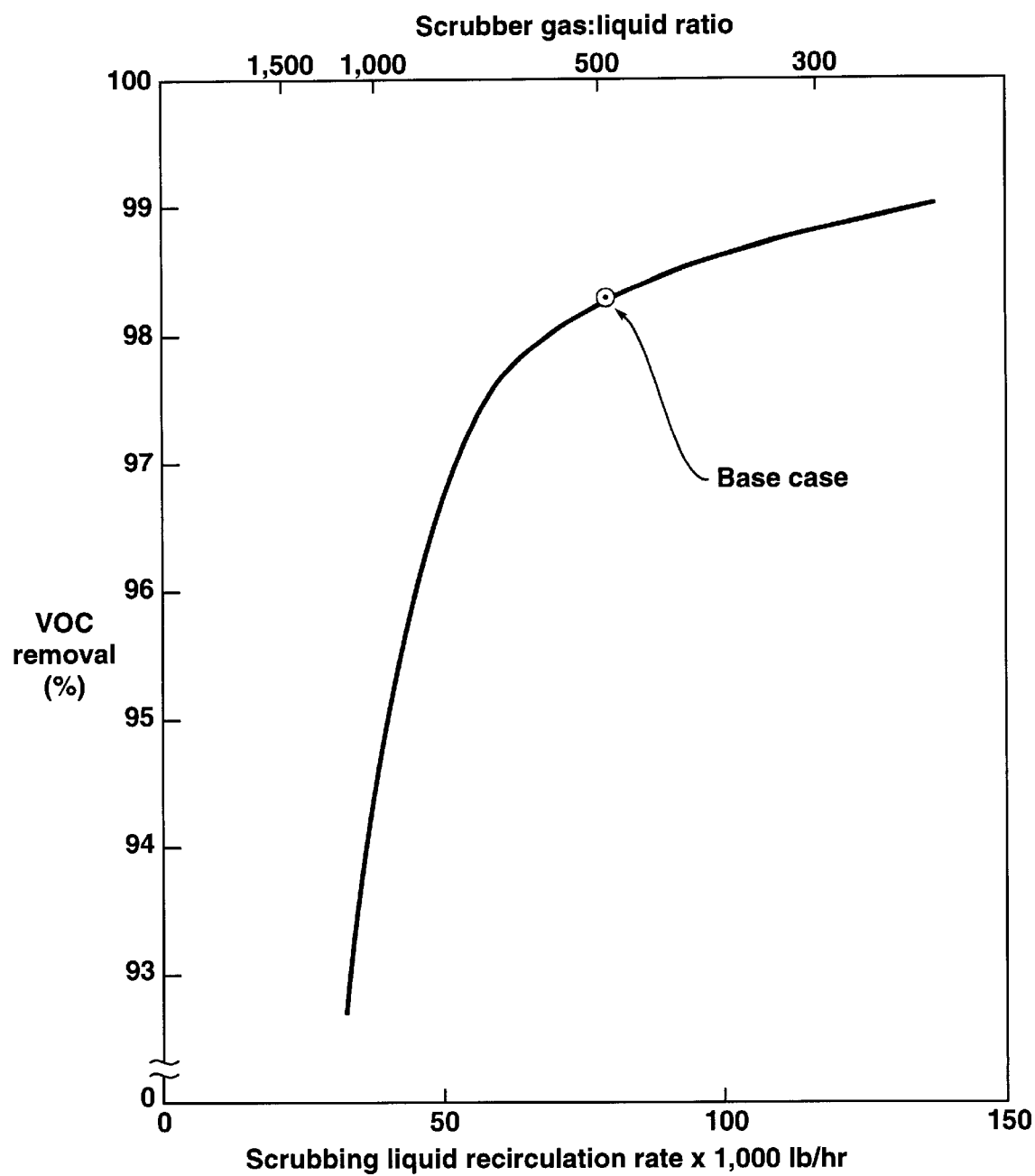
FIG. 7 is a graph showing organic removal rate as a function of gas:liquid ratio in the scrubber.

This example shows how the performance of the system can be controlled and optimized by varying the gas:liquid ratio in the scrubber. In this calculation, all operating conditions were as in Example 1, except that the scrubbing liquid recirculation rate was varied. FIG. 7 shows the effect of scrubbing liquid recirculation rate on the organic removal by the system. The Example 1 calculation is represented as the data point labelled "base case."

By increasing the scrubbing liquid flow, that is, decreasing the gas:liquid ratio in the scrubber, the performance of the scrubber increases, resulting in increased removal of methylene chloride from the feed gas. However, this requires an increase in the size of the downstream processing system to handle the additional volume of scrubbing liquid. Decreasing the scrubbing liquid flow rate, on the other hand, reduces the size and cost of the downstream processing equipment.

The base case gas:liquid ratio of 500 in the scrubber obtains 98+% removal, and is consistent with the conditions needed for optimized stripper performance calculated in Example 2.

SET II (Examples 4–6) Experimental Results

Example 4

To demonstrate the operation of the process, a pilot-scale sub-system was constructed, consisting of a stripper unit connected to a membrane separation system to remove organics from the strip gas and recirculate the clean gas back to the stripper. The scrubber portion of the system was modelled by directly mixing methylene chloride, the test organic, into the scrubbing liquid. The scrubbing liquid was Genosorb 1845 (Hoechst Celanese, Charlotte, N.C.), a polyethylene glycol dibutyl ether. The stripping column was constructed of fiberglass and was 12 inches in diameter and 12 feet tall. The column was packed with 0.75-inch plastic packing. To minimize channeling of scrubbing liquid down the walls of the column, four perforated plates were placed every 2–3 feet on the column. The scrubbing fluid was circulated through the stripping column at 0.6–2.5 gal/min. Methylene chloride was added back into the cleaned stream at a rate of 10 gram/min. The stripper column was operated at a pressure of 0.8 psia and a temperature of 20°–70° C. The membrane system, consisting of two membrane modules containing 1 m² of membrane each, was operated at a feed pressure of 150 psia and a permeate pressure of 15 psia. The stripping gas was nitrogen. The gas flow rate through the membrane system was 3.5 scfm.

Figure 8:
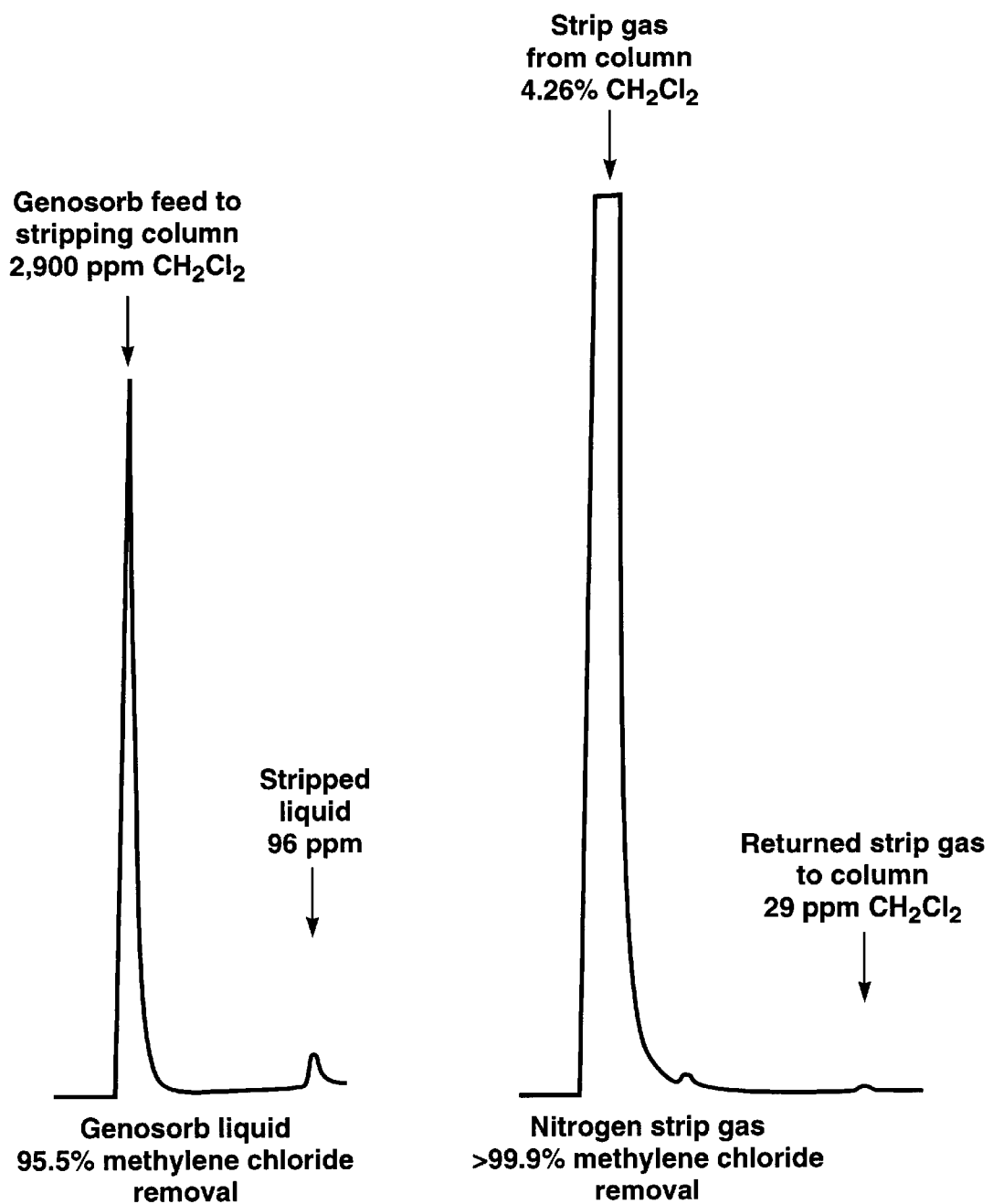
FIG. 8 is a gas chromatograph trace showing methylene chloride removal from the scrubbing liquid and the stripping gas.

The gas and liquid phases were analyzed by gas chromatography; typical traces are shown in FIG. 8. The loaded Genosorb feed liquid contained 2,000–3,000 ppm methylene chloride in most runs. After stripping by the countercurrent flow of nitrogen gas, the methylene chloride content of the Genosorb liquid was reduced by 95–96% under the normal operating conditions.

The methylene chloride concentration in the nitrogen strip gas from the column was typically in the 3–5% range. The membrane unit reduced this level to below 100 ppm.

Example 5

Figure 9:
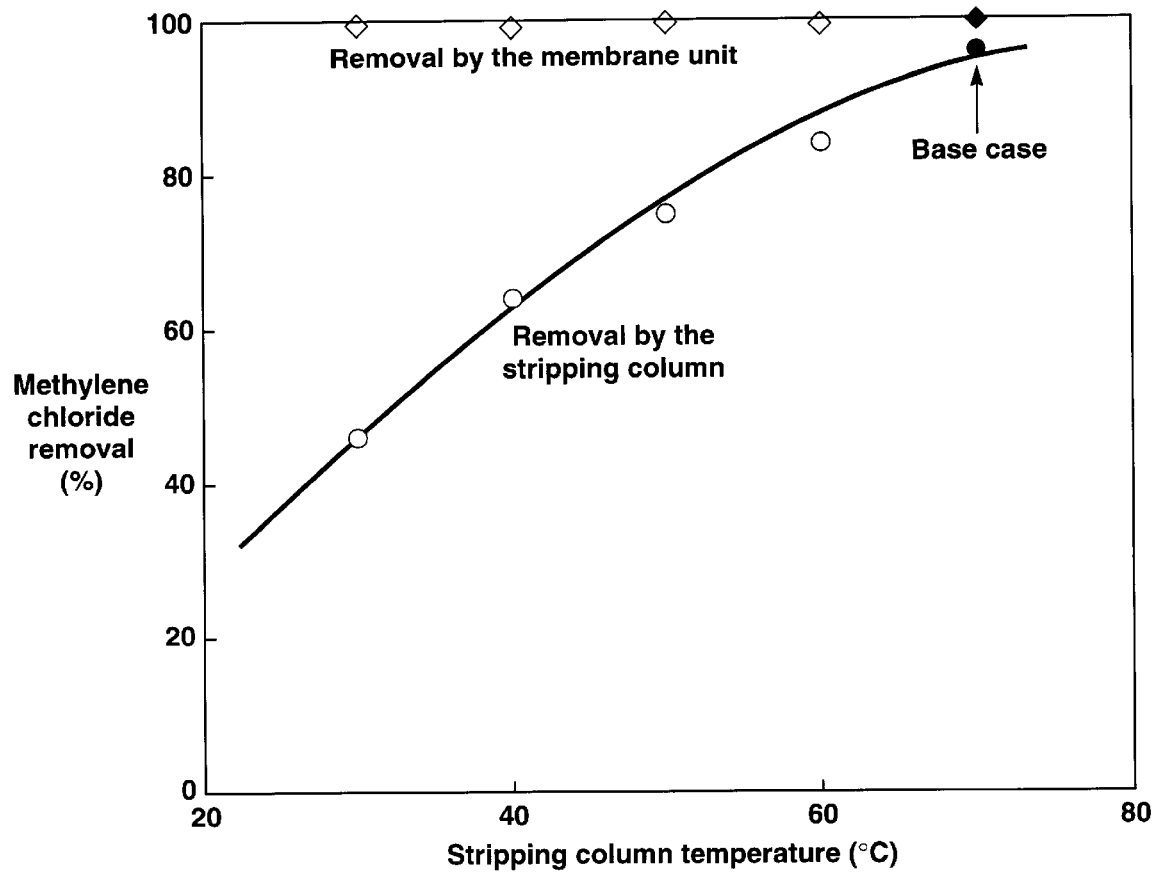
FIG. 9 is a graph showing the effect of stripping column temperature on methylene chloride removal.

The experiment of Example 4 was repeated, with the scrubbing fluid recirculation rate maintained at 1.2 gal/min and the temperature of the scrubbing fluid entering the stripper varied between 20° and 70° C. The effect of the stripping column temperature on methylene chloride removal from the Genosorb liquid and the recirculating nitrogen is shown in FIG. 9. The stripping column temperature was assumed to be 10° C. below the temperature leaving the Genosorb heater to reflect heat losses in the column. As expected, the methylene chloride removal from the Genosorb increased steadily with increased column temperature, reaching 95–96% removal at the target column temperature of 70° C. Methylene chloride removal from the strip gas by the membrane unit was constant at more than 99%.

Example 6

Figure 10:
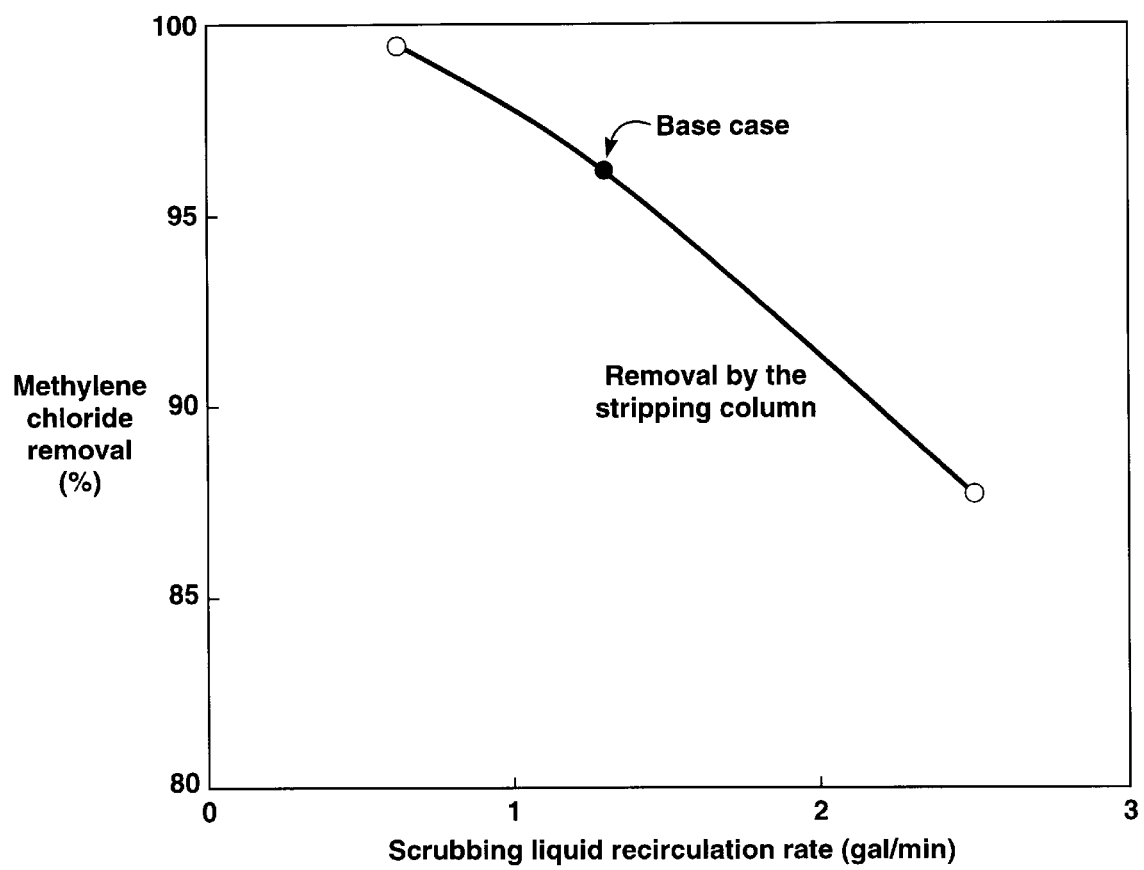
FIG. 10 is a graph showing the effect of scrubbing liquid recirculation rate on methylene chloride removal.

The experiment of Example 4 was repeated, with the temperature of the scrubbing fluid entering the stripper maintained at 70° C., and the scrubbing fluid recirculation rate varied from 0.6–2.5 gal/min. The effect of Genosorb recirculation rate on methylene chloride removal efficiency is shown in FIG. 10. As the ChemCad calculations predicted, the stripper performance was very sensitive to the scrubbing liquid recirculation rate. As the scrubbing liquid flow rate increases, the gas:liquid ratio in the stripper decreases. This in turn decreases the methylene chloride removal achieved by the stripper, as shown in FIG. 10, and results in overall loss of removal performance.

The results are in reasonably good agreement with the ChemCad calculations of the Set I examples.

SET III (Examples 7–9) Computer Modelling Calculations for Operation of the Process with Specific Gas Streams

Example 7

Removal of $C_{3+}$ Hydrocarbons from Natural Gas Streams

Natural gas as produced generally contains a mixture of hydrocarbons ranging from $C_1$ to $C_6$ with small amounts of higher hydrocarbons. To achieve easy transportation of the gas, it is often desirable to remove a portion of the heavier components to prevent condensation of these components at cold spots in the gas pipeline. These lesser components are also typically of more value as recovered liquids than as fuel in the gas stream. A ChemCad calculation was performed assuming the design of FIG. 4 for this type of dewpoint control application.

The natural gas feed was assumed to be 1,000 scfm at a pressure of 1,000 psig (416 actual l/min) and to contain 8 mol % $C_{3+}$ hydrocarbons, which should be reduced to less than 3 mol %. The scrubber was assumed to be operated with 2,167 lb/h (16.4 l/min) of $C_{14}H_{28}$ light hydrocarbon oil (n-tetradecane) as the scrubbing liquid, at a pressure of 1,000 psig and ambient temperature. The gas:liquid volume ratio in the scrubber was therefore, 416÷16.4, or 25. The $C_{3+}$-laden scrubbing liquid was then assumed to be depressurized to 50 psig and heated to 70° C. This heated liquid was assumed to be circulated to the stripper at 2,895 lb/h (21.9 l/min), and contacted with a methane strip gas stream of 60 scfm at a pressure of 50 psia (498 actual l/min). The gas:liquid volume ratio in the stripper was calculated to be 23.

The volume of gas leaving the stripper is 185 scfm, a 5.4-fold reduction in gas volume to the membrane system, and a resulting approximately 5-fold concentration of $C_{3+}$ hydrocarbons in the gas stream. Natural gas liquids are recovered in the condensation step. The membrane permeate is recycled to the compression/condensation step for further treatment. The membrane residue contains only 1.3 mol % $C_{3+}$ hydrocarbons, well below the target of 3 mol %, and is suitable for recycle to the stripper or may be directed to the pipeline.

In this application, a portion of the membrane residue stream is bled off to reduce build-up of $C_2$ and $C_3$ components in the stripper loop. This bleed gas is returned to the front of the process and mixed with the incoming feed for treatment in the scrubber.

The methane stream exiting via line 305, the treated gas from the scrubber, contains only 3 mol % $C_{3+}$ hydrocarbons, which meets pipeline specifications.

Table 2 shows the results of all the calculations.

separator, 510, removes any entrained scrubbing liquid, which is recovered in line 511, and is joined with line 503 to be recycled to the scrubbing step. The remaining organic-laden gas stream in line 512, is compressed in compressor

TABLE 2

| Component/Parameter | Stream 301 | Stream 303 | Stream 304 | Stream 305 | Stream 308 | Stream 311 | Stream 312 | Stream 314 | Stream 316 | Stream 317 | Stream 319 | Stream 320 |
|---|---|---|---|---|---|---|---|---|---|---|---|---|
| Mass Flow Rate (lb/h) | 3,361 | 2,167 | 2,895 | 2,753 | 991 | 90 | 1,438 | 1,438 | 611 | 828 | 535 | 173 |
| Gas Flow Rate (scfm) | 1,000 | 0 | 110 | 923 | 185 | 0 | 322 | 323 | 0 | 245 | 144 | 60 |
| Temperature (°C.) | 25 | 25 | 70 | 36 | 69 | 25 | 11 | 134 | 0 | 0 | −17 | −17 |
| Pressure (psia) | 1,000 | 1,000 | 50 | 1,000 | 50 | 50 | 50 | 500 | 500 | 500 | 50 | 500 |
| Component (mol %) | | | | | | | | | | | | |
| N-tetradecane | 0 | 71.23 | 28.50 | 0 | 0.02 | 0.49 | 0 | 0 | 0 | 0 | 0 | 0 |
| Methane | 86.0 | 1.30 | 26.74 | 91.71 | 57.79 | 1.10 | 65.80 | 65.80 | 18.81 | 80.79 | 72.71 | 92.30 |
| Ethane | 6.0 | 0.50 | 7.06 | 5.32 | 9.42 | 1.14 | 11.77 | 11.77 | 13.99 | 11.06 | 14.36 | 6.37 |
| Propane | 4.0 | 0.62 | 10.41 | 2.21 | 11.41 | 4.47 | 10.7 | 10.70 | 25.04 | 6.13 | 9.56 | 1.25 |
| Butane | 2.0 | 1.33 | 9.54 | 0.24 | 10.16 | 14.11 | 6.76 | 6.76 | 22.72 | 1.67 | 2.78 | 0.08 |
| Pentane | 1.0 | 4.59 | 6.06 | 0.18 | 5.30 | 21.13 | 2.79 | 2.79 | 10.66 | 0.28 | 0.48 | 2 ppm |
| Hexane | 1.0 | 20.43 | 11.66 | 0.34 | 5.90 | 57.56 | 2.17 | 2.17 | 8.78 | 0.06 | 0.11 | 13 ppm |

Example 8

Removal of Styrene from Air

Styrene monomer is present in the effluent air streams from a number of common industrial processes, for example, epoxy resin fiberglassing operations. The small amounts of styrene in these streams, often in the 10–100 ppm range, present a significant odor problem and health hazard. We used a ChemCad calculation to model the removal of 20 ppm styrene from air.

Figure 11:
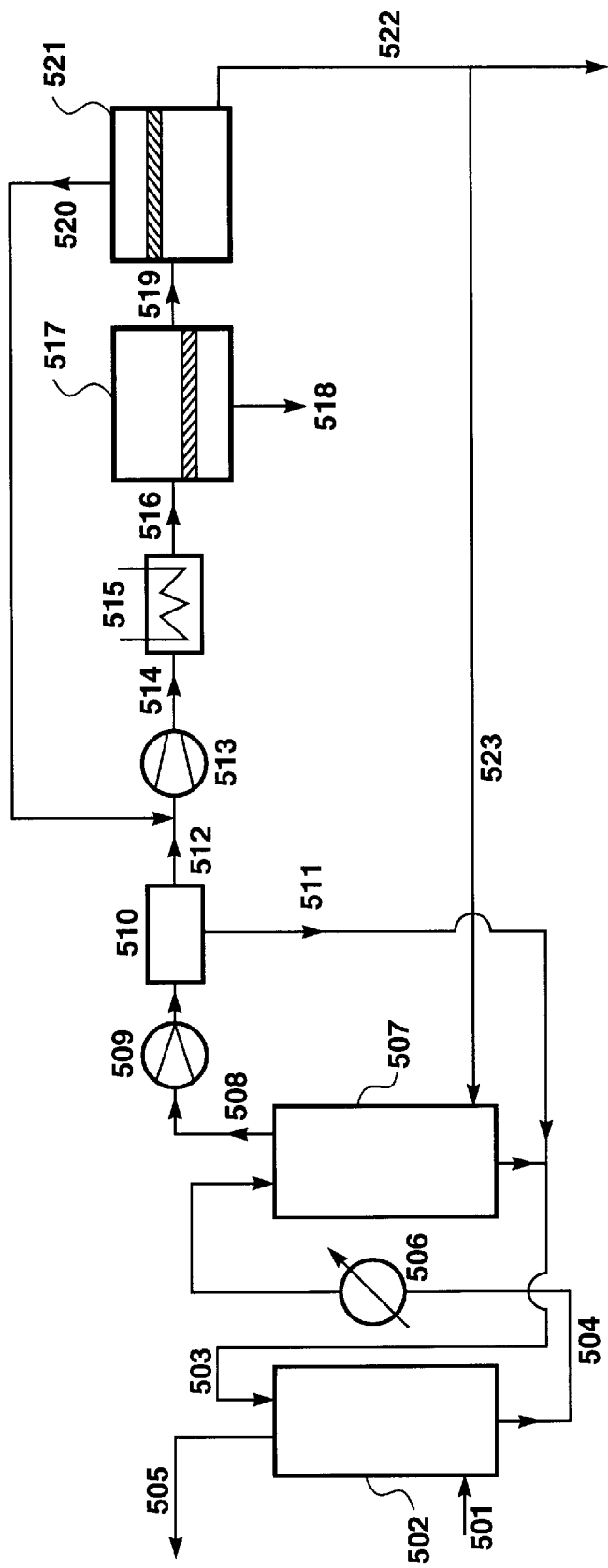
FIG. 11 is a schematic drawing of the process employing a two-step membrane unit.

Since styrene liquid has a tendency to polymerize spontaneously, the FIG. 4 arrangement, in which the styrene would be removed as a liquid condensate cannot be used. Instead, a two-step membrane arrangement is used, in which the first step produces a highly styrene-concentrated permeate gas and the second step further treats the only-partially treated residue from the first step. The arrangement is shown in FIG. 11.

In this figure, the raw gas stream, entering via line 501, is fed into a scrubber, 502, where the stream comes into intimate contact with scrubbing liquid entering through line 503. The scrubbing liquid absorbs the organic compound from the gas stream, leaving an organic-depleted gas stream, exiting through line 505, to be sent for reclamation or further treatment, or, if clean enough, to be discharged to the atmosphere. The organic-laden scrubbing liquid in line 504, is passed through a heater, 506, and sent to a stripping column, 507, where the liquid comes into intimate contact with stripping gas, entering through line 523. The stripping gas removes the organic compound from the scrubbing liquid, which is recycled through line 503 to the scrubber. The stripping column is kept under subatmospheric pressure by vacuum pump 509. The organic-laden stripping gas in line 508 is withdrawn through the vacuum line. A gas/liquid

513. This compressed gas, in line 514, is fed to chiller 515, which produces a cooled gas stream in line 516, which in turn is passed to the first membrane unit, 517. This unit contains 6 m² of membrane area, and produces a concentrated permeate gas stream recovered in line 518, containing 1.3 mol % styrene, which can be continuously purged and sent to a small incinerator or flare. The first residue, in line 519, is sent to a second membrane separation unit, 521. This unit, containing 20 m² of membrane area, permeates more of the organic and returns it through line 520 upstream of the compressor for further compression and membrane treatment. The second membrane residue, exiting through line 522, is free of styrene and is suitable for discharge or recycle through line 523 to the stripper.

As with FIGS. 1–5, FIG. 11 is a schematic showing process concepts and major apparatus elements. The apparatus used to carry out the processes will include other components, such as pumps, blowers, etc.

We assumed a styrene concentration of 20 ppm in a 10,000 scfm (283,000 l/min) airstream. The scrubbing liquid was assumed to be 59,538 lb/h (451 l/min) n-tetradecane, a light mineral oil. Thus, the gas:liquid ratio in the scrubber was calculated to be 627. The styrene concentration was increased 15-fold, to 300 ppm, in the scrubber. The gas flow to the stripper was assumed to be 52 scfm (43,265 l/min), and the liquid flow 59,561 lb/h (451 l/min). The stripper gas:liquid volume ratio was calculated to be 96. The off-gas from the stripper column contained 3,260 ppm styrene monomer, an overall increase of 163-fold over the feed gas concentration.

Table 3 shows the results of all the calculations.

TABLE 3

| Component/Parameter | Stream 501 | Stream 503 | Stream 504 | Stream 505 | Stream 508 | Stream 511 | Stream 512 | Stream 516 | Stream 518 | Stream 519 | Stream 520 | Stream 522 |
|---|---|---|---|---|---|---|---|---|---|---|---|---|
| Mass Flow Rate (lb/h) | 48,150 | 59,538 | 59,561 | 48,137 | 574 | 304 | 477 | 477 | 65 | 412 | 207 | 248 |
| Gas Flow Rate (scfm) | 10,000 | 0 | 4 | 9,996 | 65 | 0 | 98 | 98 | 12 | 85 | 42 | 52 |
| Temperature (°C.) | 25 | 100 | 100 | 24 | 100 | 25 | 28 | 35 | 34 | 33 | 31 | 31 |
| Pressure (psia) | 15 | 0.5 | 0.5 | 15 | 0.5 | 0.5 | 0.5 | 200 | 15 | 200 | 0.5 | 200 |

TABLE 3-continued

| Component/Parameter | Stream 501 | Stream 503 | Stream 504 | Stream 505 | Stream 508 | Stream 511 | Stream 512 | Stream 516 | Stream 518 | Stream 519 | Stream 520 | Stream 522 |
|---|---|---|---|---|---|---|---|---|---|---|---|---|
| Component (mol %) | | | | | | | | | | | | |
| N-tetradecane | 0 | 0 | 99.76 | 0 | 14.13 | 99.46 | 0.06 | 0.06 | 0.32 | 0.02 | 0.04 | 0 |
| Nitrogen | 80.0 | 99.97 | 0.14 | 80.0 | 72.73 | 0 | 78.92 | 78.92 | 62.85 | 81.29 | 71.27 | 91.1 |
| Oxygen | 20.0 | 0 | 0.07 | 20.0 | 12.82 | 0 | 20.78 | 20.78 | 35.53 | 18.61 | 28.52 | 8.9 |
| Styrene | 20 ppm | 0.02 | 0.03 | 4 ppm | 0.32 | 0.53 | 0.24 | 0.24 | 1.30 | 0.08 | 0.17 | 0 |

Example 9

Operation of the Process with an Organic-Rejecting Gas-Permeable Membrane for the Removal of Toluene from Air We performed a ChemCad calculation to model the removal of 2,000 ppm toluene from air, using a membrane selective for air over toluene. We assumed that the membrane was polyphenylene oxide, having the following approximate pressure-normalized fluxes:

Nitrogen: $5 \times 10^{-6}$ cm$^3$(STP)/cm$^2 \cdot$sec$\cdot$cmHg

Oxygen: $20 \times 10^{-6}$ cm$^3$(STP)/cm$^2 \cdot$sec$\cdot$cmHg

Toluene: $0.3 \times 10^{-6}$ cm$^3$(STP)/cm$^2 \cdot$sec$\cdot$cmHg n-tetradecane: $0.2 \times 10^{-6}$ cm$^3$(STP)/cm$^2 \cdot$sec$\cdot$cmHg The process was assumed to use a system design as shown in FIG. 3. The feed gas to the scrubber was assumed to be a 10,000 scfm (283,000 l/min) air stream contaminated with 2,000 ppm toluene. The scrubbing liquid was assumed to be 59,402 lb/h (449 l/min) n-tetradecane, yielding a gas:liquid ratio of 630. The concentration of toluene is increased 6-fold in the scrubbing step. The gas flow to the stripping step was assumed to be 243 scfm (202,180 l/min), and the liquid flow 59,698 lb/h (451 l/min), yielding a gas:liquid ratio of 448. The concentration of toluene is increased an additional 6-fold in the stripping step.

The toluene is recovered in the condensation step. The membrane permeate air stream contains 100 ppm toluene, and is suitable for recycle to the stripper. The membrane residue is recycled downstream of the compressor for further condensation treatment. The overall toluene removal rate is 95 mol %.

This type of system uses a very large amount of membrane (in this example, 2,028 m$^2$), compared to organic-selective membrane systems (10–100 m$^2$ in previous examples), but compression costs are normally lower than with the use of an organic-selective membrane system.

Table 4 shows the results of all the calculations.

Example 10

Henry's Law Coefficients of Potential Scrubbing Liquids

We measured the Henry's law partition coefficient for two representative organic compounds, (1) toluene, a typical hydrocarbon, and (2) trichloroethylene (TCE), a chlorinated solvent, to determine the partition of the organic between air and the scrubbing liquid at ambient temperature (20° C.). Liquids with a high concentration of the organic at equilibrium, relative to the air phase, were considered good candidates for scrubbing media.

We calculated the saturation concentration of the organic in air and measured the solubility of the organic in the liquid phase. A measured volume of test liquid was placed in an airtight bottle of known volume, the balance of the bottle being occupied by air. We injected 10–30 μL of the organic through a septum in the lid of the bottle. The solution in the bottle was stirred for a few hours to reach equilibrium between the air and liquid phases. A sample of the air was injected into a gas chromatograph equipped with a flame ionization detector to determine the concentration of the organic in the air phase. The total weight of the organic in the air phase could then be calculated. Subtracting this amount from the original amount of organic introduced into the bottle yielded the weight and concentration of the organic in the liquid phase. The Henry's law coefficient was calculated from these data, and is expressed as mg/m$^3$(air)/mg/m$^3$(liquid). The results are shown in Table 5.

TABLE 4

| Component/Parameter | Stream 201 | Stream 203 | Stream 204 | Stream 205 | Stream 208 | Stream 210 | Stream 212 | Stream 213 | Stream 215 | Stream 216 | Stream 217 |
|---|---|---|---|---|---|---|---|---|---|---|---|
| Mass Flow Rate (lb/h) | 48,353 | 59,402 | 59,698 | 48,054 | 2,893 | 1,688 | 329 | 1,358 | 304 | 188 | 1,169 |
| Gas Flow Rate (scfm) | 10,000 | 0 | 7 | 9,978 | 307 | 302 | 0 | 282 | 63 | 39 | 243 |
| Temperature (°C.) | 25 | 25 | 100 | 25 | 99 | 358 | 5 | 60 | 58 | 58 | 58 |
| Pressure (psia) | 15 | 15 | 0.5 | 15 | 0.5 | 200 | 200 | 200 | 15 | 200 | 15 |
| Component (mol %) | | | | | | | | | | | |
| N-tetradecane | 0 | 99.79 | 98.55 | 0 | 13.51 | 0.39 | 5.78 | 0 | 0 | 0 | 0 |
| Nitrogen | 79.92 | 0 | 0.14 | 80.07 | 62.74 | 76.57 | 0.78 | 82.02 | 79.26 | 98.88 | 79.26 |
| Oxygen | 19.88 | 0 | 0.07 | 19.91 | 16.43 | 16.71 | 0.60 | 17.86 | 20.73 | 0.35 | 20.73 |
| Toluene | 0.20 | 0.20 | 1.24 | 0.01 | 7.32 | 6.33 | 92.84 | 0.12 | 0.01 | 0.77 | 0.01 |

TABLE 5

| Scrubbing Liquid | Henry's Law Partition Coefficient [$10^{-3}$ mg/m$^3$ (air)/mg/m$^3$ (liquid)] | |
| --- | --- | --- |
| | Toluene | TCE |
| 100% PEG (Polyethylene Glycol-- MW ~600) | 0.75 | 1.6 |
| 100% EG (Ethylene Glycol) | 6 | 10 |
| 100% PS ® 040 (Dimethylsiloxane alkylene oxide copolymer) | 0.9 | 2 |
| 30% Pluronic ® L62 (Ethylene oxide-propylene oxide copolymer) | 2 | 10 |
| 50% Pluronic ® L62 | 0.3 | 5 |
| 100% Pluronic ® L62 | — | 0.9 |
| 50% Iconal ® OP40–70 (Alkoxylated alkylphenol) | 6 | — |
| 100% Inland ® 19 oil (Paraffinic oil) | 0.3 | 0.8 |
| 100% Isopar ® L (Isoparaffinic oil) | 0.3 | 0.7 |
| 100% Silicone D-7040 | — | 0.4 |

We claim:

1. A process for removing an organic compound from a raw gas stream, comprising:

(a) performing a scrubbing step, comprising:
contacting said raw gas stream with a scrubbing liquid, thereby dissolving at least a portion of said organic compound in said scrubbing liquid;
resulting in a scrubbing liquid stream enriched in said organic compound, and a treated gas stream depleted in said organic compound;

(b) performing a stripping step, comprising:
contacting said scrubbing liquid stream enriched in said organic compound with a strip gas, thereby causing stripping of said organic compound from said scrubbing liquid stream by said strip gas;
resulting in an enriched strip gas stream enriched in said organic compound and a depleted scrubbing liquid stream depleted in said organic compound;

(c) performing a condensation step, comprising:
condensing at least a portion of said enriched strip gas stream;
resulting in a condensed stream enriched in said organic compound, and a non-condensed stream depleted in said organic compound;

(d) performing a membrane separation step, comprising:
providing a membrane having a feed side and a permeate side;
providing a driving force for transmembrane permeation;
contacting said feed side with said non-condensed stream;
withdrawing from said membrane an enriched stream, enriched in said organic compound compared with said non-condensed stream;
withdrawing from said membrane a depleted stream, depleted in said organic compound compared with said non-condensed stream.

2. The process of claim 1, wherein said organic compound is a saturated hydrocarbon.

3. The process of claim 1, wherein said organic compound is an unsaturated hydrocarbon.

4. The process of claim 1, wherein said organic compound is a halogenated hydrocarbon.

5. The process of claim 1, wherein said raw gas stream comprises air.

6. The process of claim 1, wherein said raw gas stream comprises nitrogen.

7. The process of claim 1, wherein said raw gas stream comprises natural gas.

8. The process of claim 1, wherein the concentration of said organic compound in said raw gas stream is less than 5%.

9. The process of claim 1, wherein the concentration of said organic compound in said raw gas stream is less than 1%.

10. The process of claim 1, wherein the concentration of said organic compound in said raw gas stream is less than 5,000 ppm.

11. The process of claim 1, wherein said scrubbing liquid comprises an organic liquid.

12. The process of claim 1, wherein said scrubbing liquid comprises an inorganic liquid.

13. The process of claim 1, wherein said scrubbing liquid is a silicone oil.

14. The process of claim 1, wherein said scrubbing liquid is a glycol ether.

15. The process of claim 1, wherein said scrubbing liquid is a light mineral oil.

16. The process of claim 1, wherein said scrubbing step is carried out at ambient temperature.

17. The process of claim 1, wherein said scrubbing step removes at least 95% of said organic compound from said raw gas stream.

18. The process of claim 1, wherein said scrubbing step removes at least 98% of said organic compound from said raw gas stream.

19. The process of claim 1, wherein said treated gas stream depleted in said organic compound is vented to the atmosphere.

20. The process of claim 1, wherein said strip gas is a non-condensable gas at the operating conditions of the process.

21. The process of claim 1, wherein said strip gas is air.

22. The process of claim 1, wherein said strip gas is nitrogen.

23. The process of claim 1, wherein said strip gas is methane.

24. The process of claim 1, wherein said stripping step is carried out at a temperature of at least about 70° C.

25. The process of claim 1, wherein said scrubbing step is carried out at a temperature. T° C., and said stripping step is carried out at a temperature at least about (T+30)° C.

26. The process of claim 1, wherein said stripping step is carried out at a pressure less than about 2 psia.

27. The process of claim 1, wherein said stripping step is carried out at a pressure less than about 1 psia.

28. The process of claim 1, wherein a pressure ratio of about 5 is maintained between said scrubbing step and said stripping step.

29. The process of claim 1, wherein said stripping step removes at least about 90% of said organic compound from said scrubbing liquid stream.

30. The process of claim 1, wherein said scrubbing liquid stream depleted in said organic compound is recycled to said scrubbing step.

31. The process of claim 1, wherein said condensation step is carried out at a temperature of at least about 0° C.

32. The process of claim 1, wherein said condensed stream is recovered for reuse.

33. The process of claim 1, wherein said membrane is organic selective.

34. The process of claim 33, wherein said membrane comprises a rubbery polymer.

35. The process of claim 34, wherein said membrane comprises silicone rubber.

36. The process of claim 33, wherein said membrane comprises a polymer having repeating units of

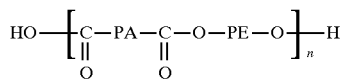

wherein PA is a polyamide segment, PE is a polyether segment, and n is a positive integer.

37. The process of claim 33, wherein said membrane comprises PTMSP.

38. The process of claim 1, wherein said membrane is organic rejecting.

39. The process of claim 38, wherein said membrane comprises a glassy polymer.

40. The process of claim 1, wherein said membrane separation step is carried out at a pressure less than about 300 psig.

41. The process of claim 1, wherein said enriched stream is a permeate stream.

42. The process of claim 1, wherein said enriched stream is a residue stream.

43. The process of claim 1, wherein said membrane separation step removes at least 90% of said organic compound from said non-condensed stream.

44. The process of claim 1, wherein said enriched stream is recycled to said condensation step.

45. The process of claim 1, wherein said depleted stream is recycled to said stripping step.

46. A process for removing an organic compound from a raw gas stream, comprising:
   (a) performing a scrubbing step, comprising:
      contacting said raw gas stream with a scrubbing liquid, thereby dissolving at least a portion of said organic compound in said scrubbing liquid;
      resulting in a scrubbing liquid stream enriched in said organic compound, and a gas stream depleted in said organic compound;
   (b) performing a stripping step, comprising:
      contacting said scrubbing liquid stream enriched in said organic compound with a strip gas, thereby causing stripping of said organic compound from said scrubbing liquid stream by said strip gas;
      resulting in a strip gas stream enriched in said organic compound, and a scrubbing liquid stream depleted in said organic compound;
   (c) performing a membrane separation step, comprising:
      providing a membrane having a feed side and a permeate side;
      providing a driving force for transmembrane permeation;
      contacting said feed side with said strip gas stream enriched in said organic compound;
      withdrawing from said membrane an enriched stream, enriched in said organic compound compared with said strip gas stream;
      withdrawing from said membrane a depleted stream, depleted in said organic compound compared with said strip gas stream.

47. The process of claim 46, wherein said raw gas stream comprises natural gas.

48. The process of claim 46, wherein said scrubbing liquid stream depleted in said organic compound is recycled to said scrubbing step.

49. The process of claim 46, wherein said membrane comprises a rubbery polymer.

50. The process of claim 46, wherein said depleted stream is recycled to said stripping step.

51. An apparatus for removing an organic compound from a gas stream, comprising:
   (a) an absorbent scrubbing unit having a feed gas inlet, a treated gas outlet, a scrubbing liquid inlet, and an organic-enriched liquid outlet;
   (b) a gas stripping unit having a stripping gas inlet, an organic-enriched gas outlet, an organic-enriched liquid inlet, and an organic-depleted liquid outlet, said gas stripping unit being connected in a liquid-transferring loop with said absorbent scrubbing unit such that an organic-enriched liquid can flow from said organic-enriched liquid outlet to said organic-enriched liquid inlet of said gas stripping unit, and such that an organic-depleted liquid can flow from said organic-depleted liquid outlet to said scrubbing liquid inlet of said absorbent scrubbing unit;
   (c) means for providing a driving force in said liquid-transferring loop;
   (d) a membrane separation unit containing a membrane having a feed side and a permeate side, said membrane separation unit being connected in a gas-transferring loop with said gas stripping unit such that an organic-enriched gas can flow from said organic-enriched gas outlet to said feed side of said membrane, and such that an organic-depleted gas can flow from said feed side after treatment to said stripping gas inlet of said gas stripping unit;
   (e) means for providing a driving force for transmembrane permeation in said membrane separation unit.

52. The apparatus of claim 51, wherein said means for providing a driving force in said liquid-transferring loop comprises a heater.

53. The apparatus of claim 51, wherein said means for providing a driving force in said liquid-transferring loop comprises a pressure reduction valve.

54. The apparatus of claim 51, wherein said means for providing a driving force for transmembrane permeation comprises a compressor connected between said organic-enriched gas outlet and said feed side.

55. The apparatus of claim 54, further comprising a condenser connected between said compressor and said feed side.

* * * * *